US012624238B2

(12) United States Patent
Amako et al.

(10) Patent No.: US 12,624,238 B2
(45) Date of Patent: May 12, 2026

(54) PRINTED MATERIAL

(71) Applicant: YAMAMOTO CHEMICALS, INC., Yao (JP)

(72) Inventors: Takamichi Amako, Yao (JP); Hiroyuki Sasaki, Yao (JP)

(73) Assignee: YAMAMOTO CHEMICALS, INC., Yao (JP)

( * ) Notice: Subject to any disclaimer, the term of this patent is extended or adjusted under 35 U.S.C. 154(b) by 503 days.

(21) Appl. No.: 18/267,675

(22) PCT Filed: Nov. 25, 2021

(86) PCT No.: PCT/JP2021/043159
§ 371 (c)(1),
(2) Date: Jun. 15, 2023

(87) PCT Pub. No.: WO2022/130925
PCT Pub. Date: Jun. 23, 2022

(65) Prior Publication Data
US 2024/0101849 A1     Mar. 28, 2024

(30) Foreign Application Priority Data
Dec. 16, 2020   (JP) ................................. 2020-208169

(51) Int. Cl.
*C09D 11/50*         (2014.01)
*B42D 25/382*        (2014.01)
*C09D 11/107*        (2014.01)

(52) U.S. Cl.
CPC ............ *C09D 11/50* (2013.01); *B42D 25/382* (2014.10); *C09D 11/107* (2013.01)

(58) Field of Classification Search
CPC ...... C09D 11/50; C09D 11/107; B42D 25/382
(Continued)

(56) References Cited

U.S. PATENT DOCUMENTS 10,604,665 B2    3/2020   Okada et al.
10,761,468 B2    9/2020   Tanaka et al.
(Continued)

FOREIGN PATENT DOCUMENTS

EP          3 252 113 A1    1/2016
EP          3 674 099 A1    8/2018
(Continued)

OTHER PUBLICATIONS

Extended European Search Report issued Oct. 16, 2024, in European Patent Application No. 21906288.2.
(Continued)

*Primary Examiner* — Betelhem Shewareged
(74) *Attorney, Agent, or Firm* — Birch, Stewart, Kolasch & Birch, LLP

(57) ABSTRACT

A printed material (1) has a base substance (1), an absorption part (22) (a near infrared ray absorbing layer (3)) that is provided on the base substance (1) to contain a near infrared ray absorbing material, and a code shape (20) that is formed in a predetermined shape from the absorption part (22) or by covering a part of the absorption part (22) and that outputs code information (CI), upon irradiation with light of near infrared rays, as reflected light of the light of near infrared rays, where in the near infrared ray absorbing material, in a case where an integral value of transmittance of visible light at 400 nm to 750 nm is denoted as a first integral value X1, and an integral value of transmittance in a 20 nm width that is centered on a predetermined wavelength λ of the light of near infrared rays is denoted as a second integral value X2, a ratio R=X2/X1 between the second integral value X2 and the first integral value X1 is 0.09 or more.

9 Claims, 17 Drawing Sheets

(58) Field of Classification Search
USPC ..................................................... 428/195.1
See application file for complete search history.

(56) References Cited

U.S. PATENT DOCUMENTS

| | | | |
|---|---|---|---|
| 10,899,162 B2 | 1/2021 | Ohkawa et al. | |
| 11,084,949 B2 | 8/2021 | Okada et al. | |
| 2001/0001472 A1* | 5/2001 | Sano ........................ | G06K 7/12 |
| | | | 235/462.01 |
| 2017/0012072 A1* | 1/2017 | Tsuruta .................. | G02B 5/208 |
| 2018/0016450 A1 | 1/2018 | Okada et al. | |
| 2019/0196382 A1 | 6/2019 | Tanaka et al. | |
| 2020/0115570 A1 | 4/2020 | Okada et al. | |
| 2020/0180346 A1 | 6/2020 | Ohkawa et al. | |
| 2024/0101849 A1* | 3/2024 | Amako .................... | B41M 3/14 |

FOREIGN PATENT DOCUMENTS

| | | | |
|---|---|---|---|
| JP | 6-274677 A | 9/1994 | |
| JP | 7-276779 A | 10/1995 | |
| JP | 10-91746 A | 4/1998 | |
| JP | 2007-109147 A | 4/2007 | |
| JP | 2007-156722 A | 6/2007 | |
| JP | 2007-203653 A | 8/2007 | |
| JP | 2011-25503 A | 2/2011 | |
| JP | 2018-89840 A | 6/2018 | |
| JP | 2019-117352 A | 7/2019 | |
| KR | 10-2009-0068874 A | 6/2009 | |
| WO | WO 2020/061629 A1 | 4/2020 | |

OTHER PUBLICATIONS

International Search Report (PCT/ISA/210) issued in PCT/JP2021/043159, dated Feb. 1, 2022.
Written Oponion of the International Searching Authority (PCT/ISA/237) issued in PCT/JP2021/043159, dated Feb. 1, 2022.
Japanese Office Action for Japanese Application No. 2022-569819, dated Dec. 2, 2025.

* cited by examiner

[FIG.1]
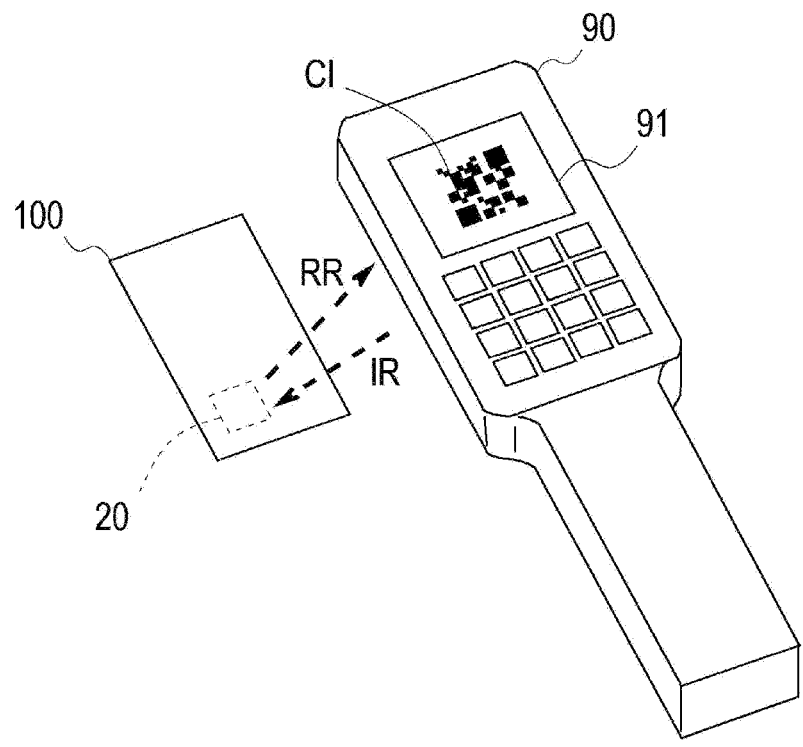

[FIG.2A]
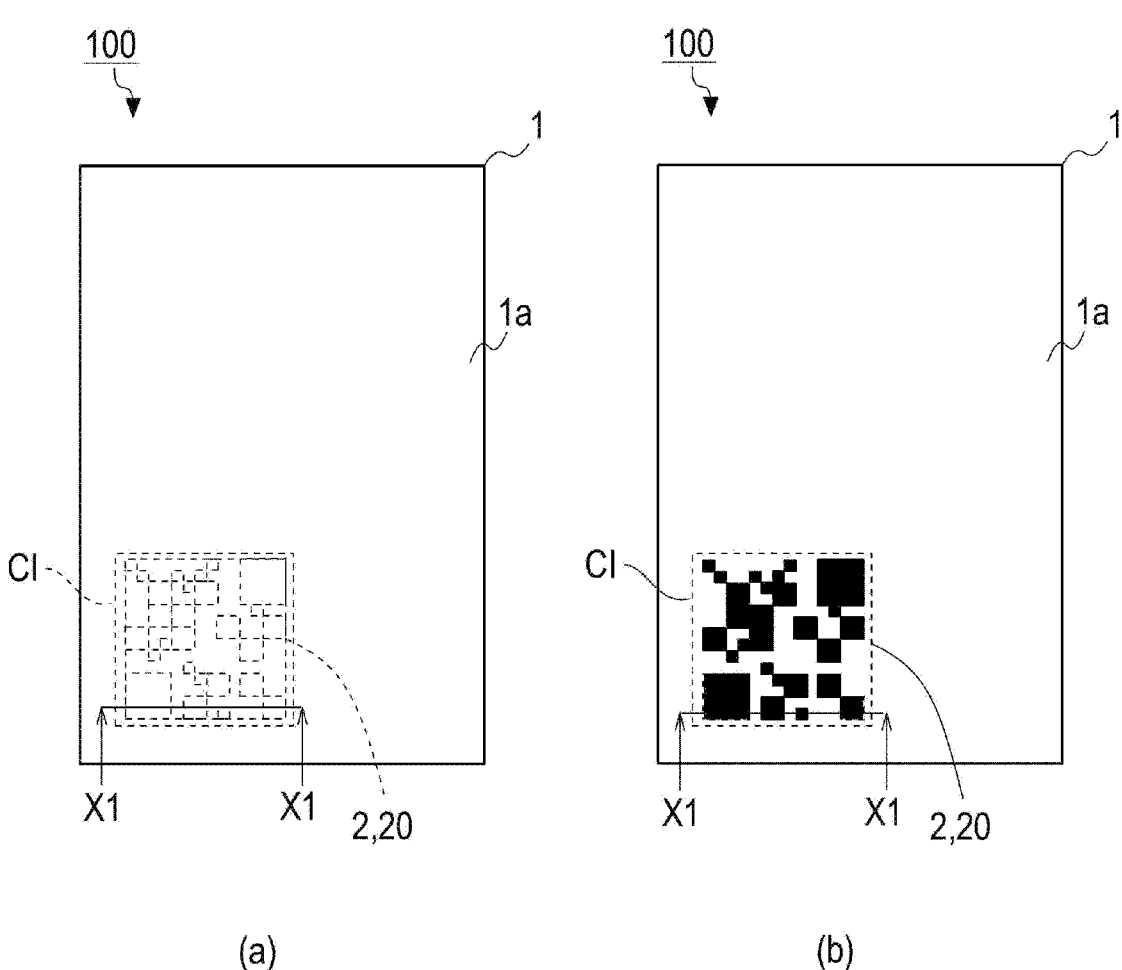
(a)                                    (b)

[FIG.2B]
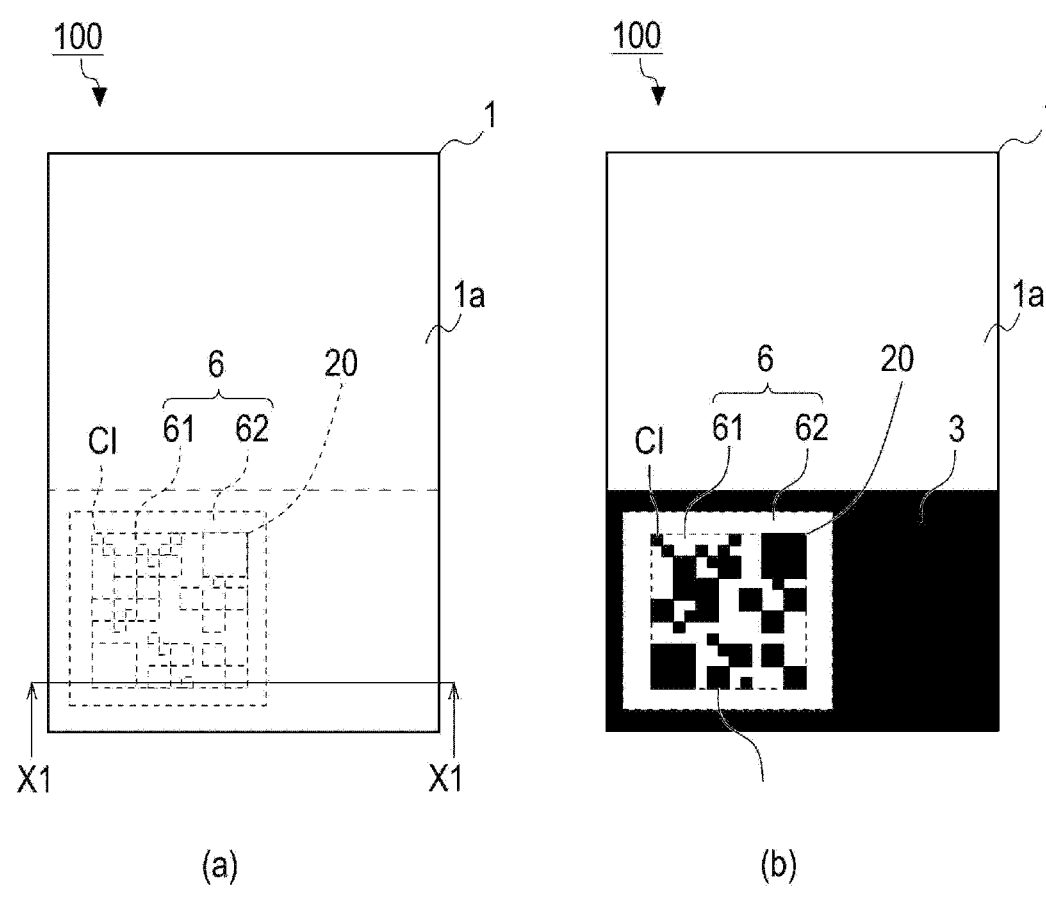
(a)                                  (b)

[FIG. 3A]
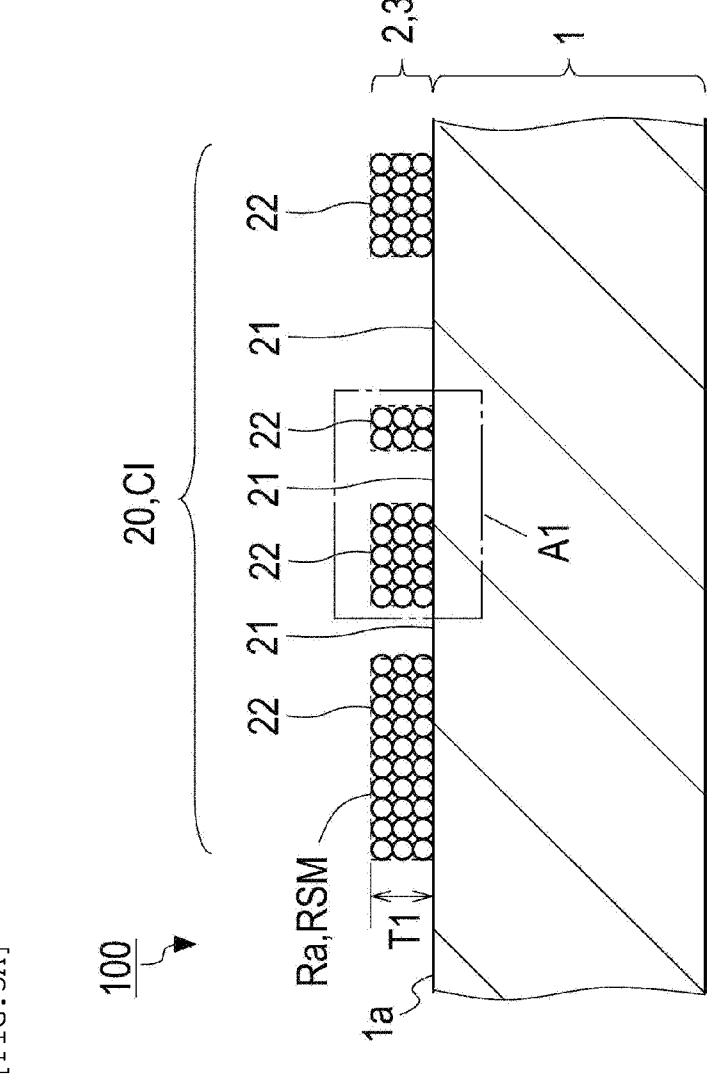

[FIG. 3B]
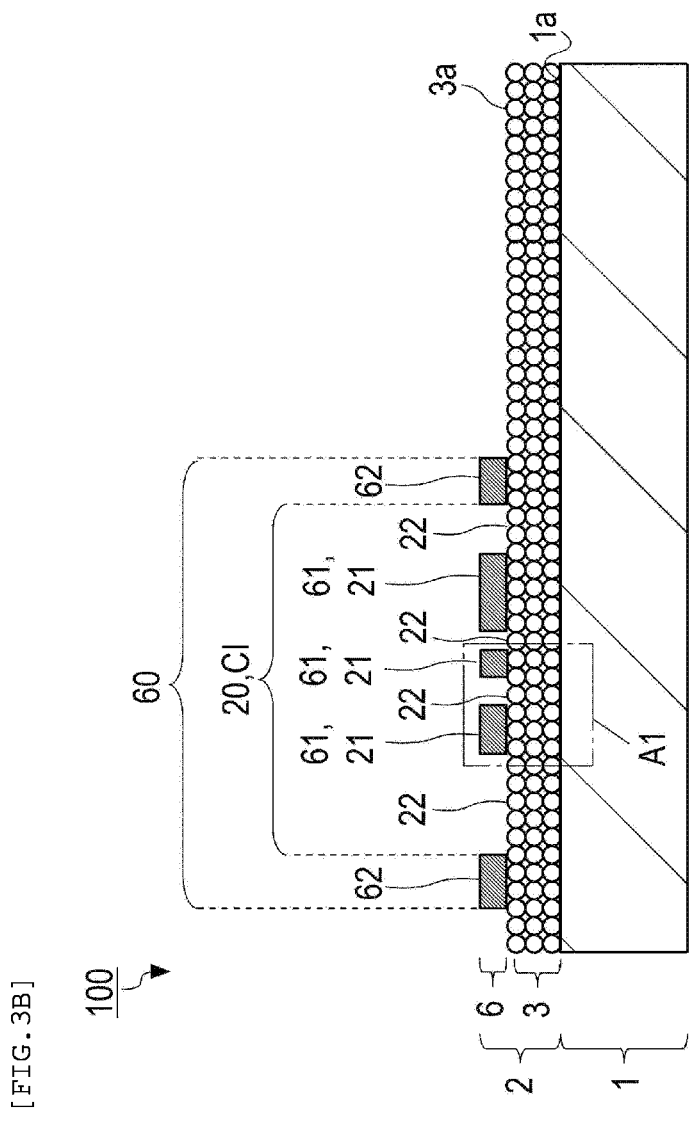

[FIG.4A]
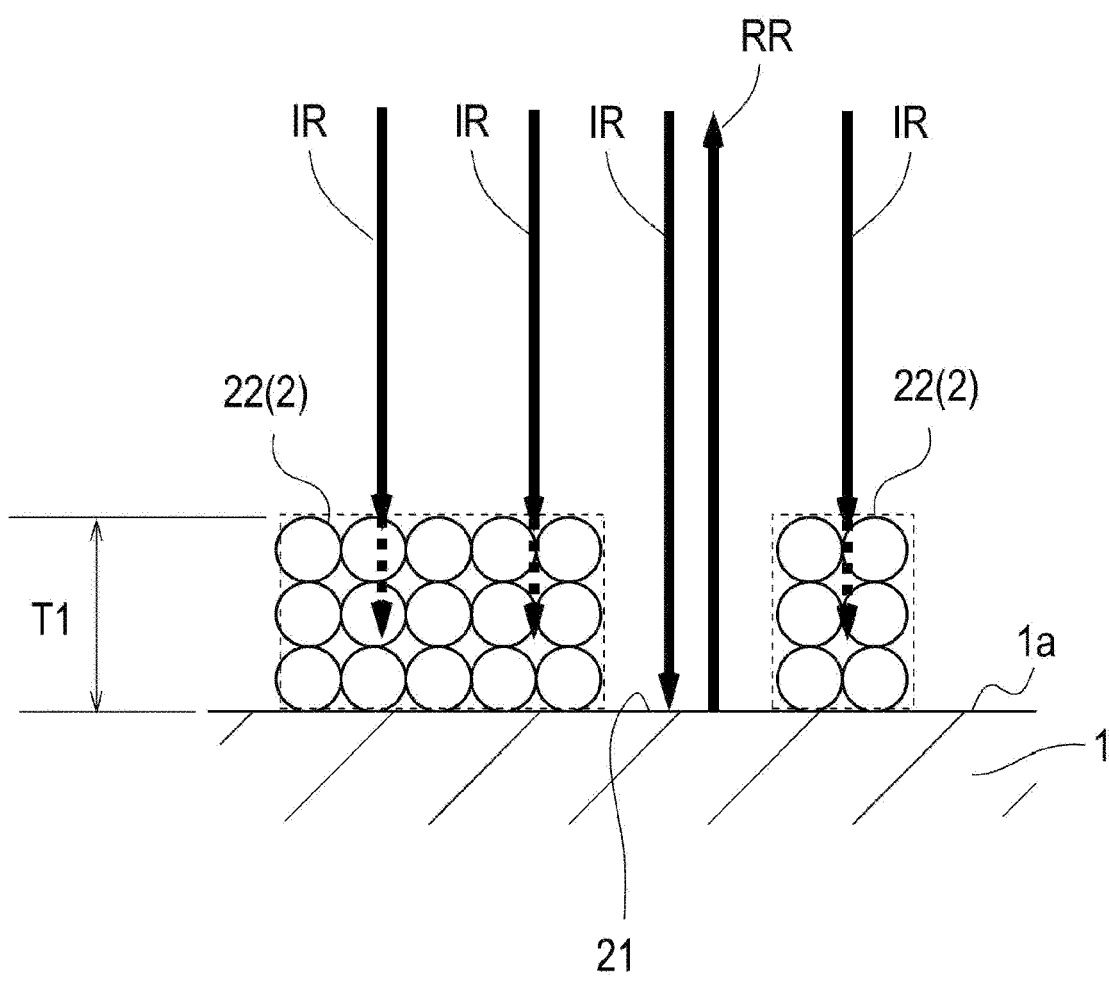

[FIG.4B]
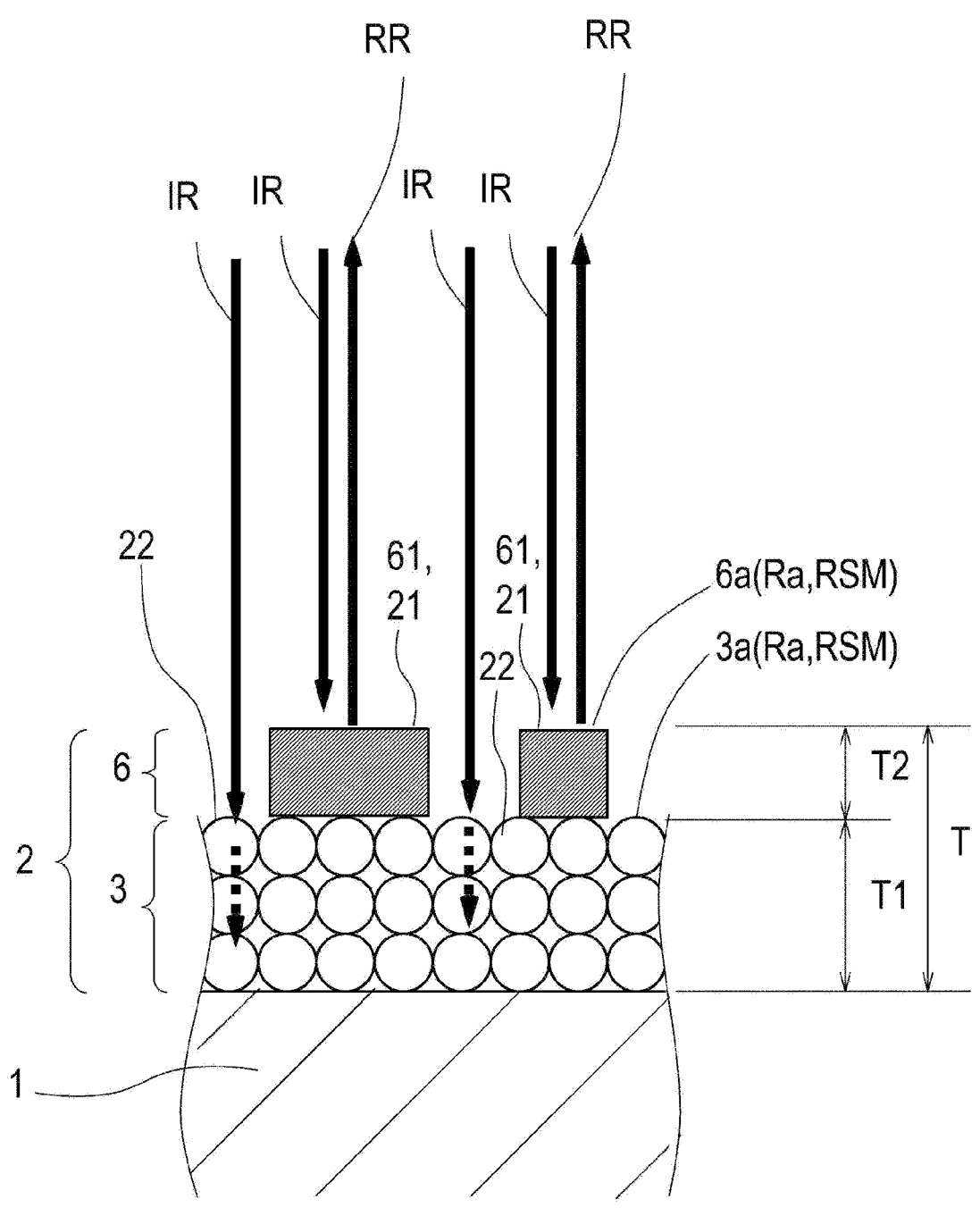

[FIG.5]
(a)
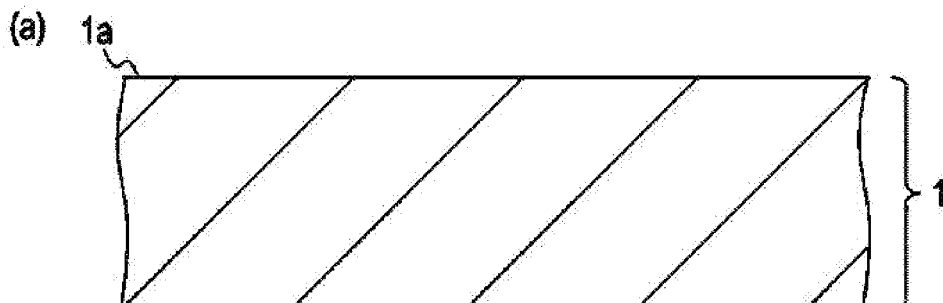
(b)
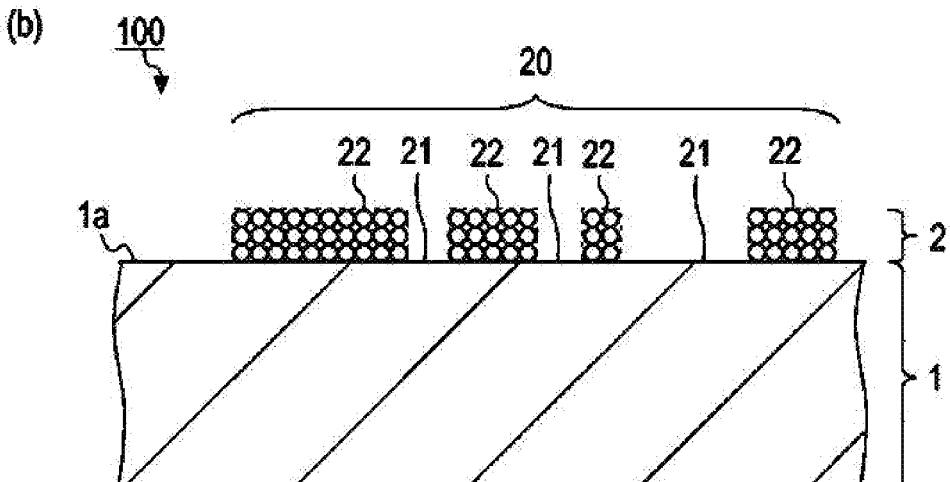
(c)
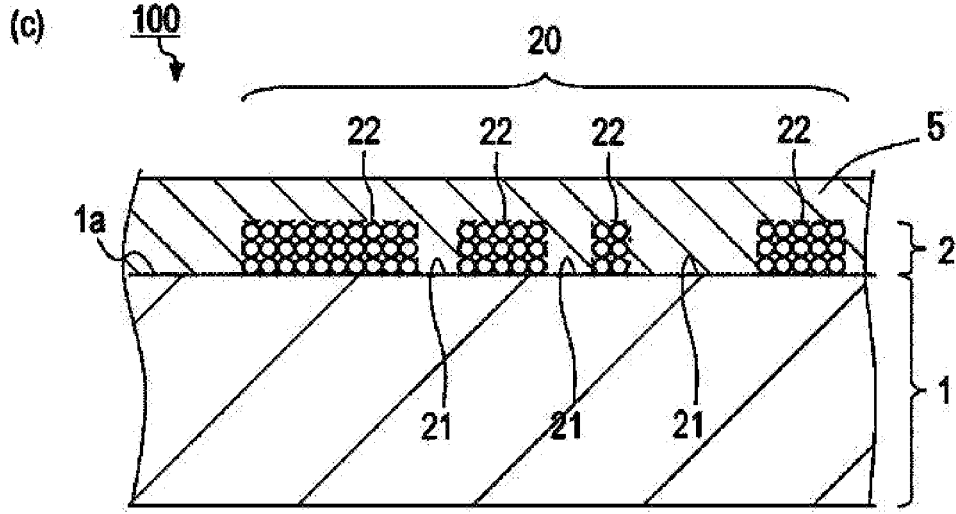

[FIG. 6]
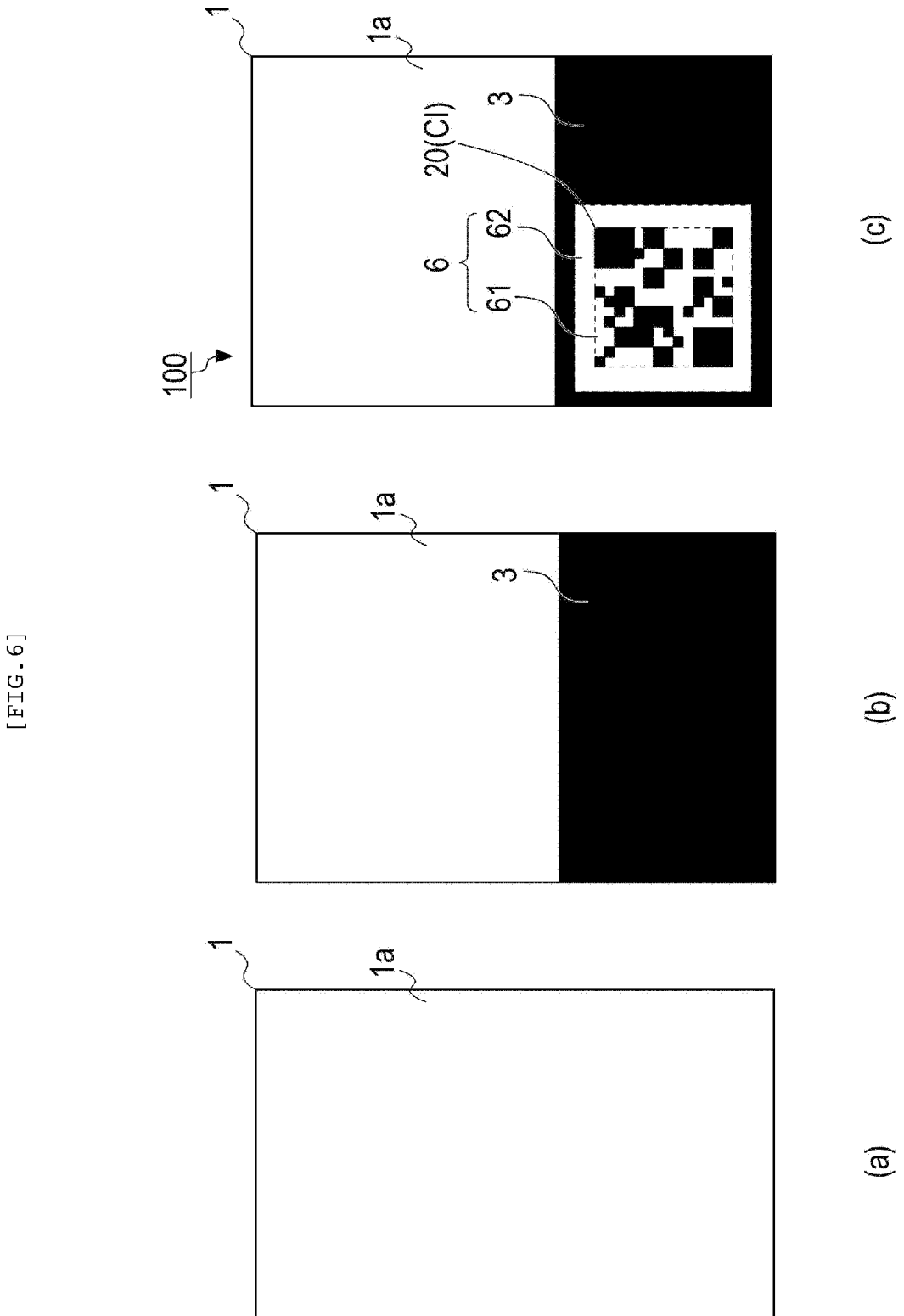

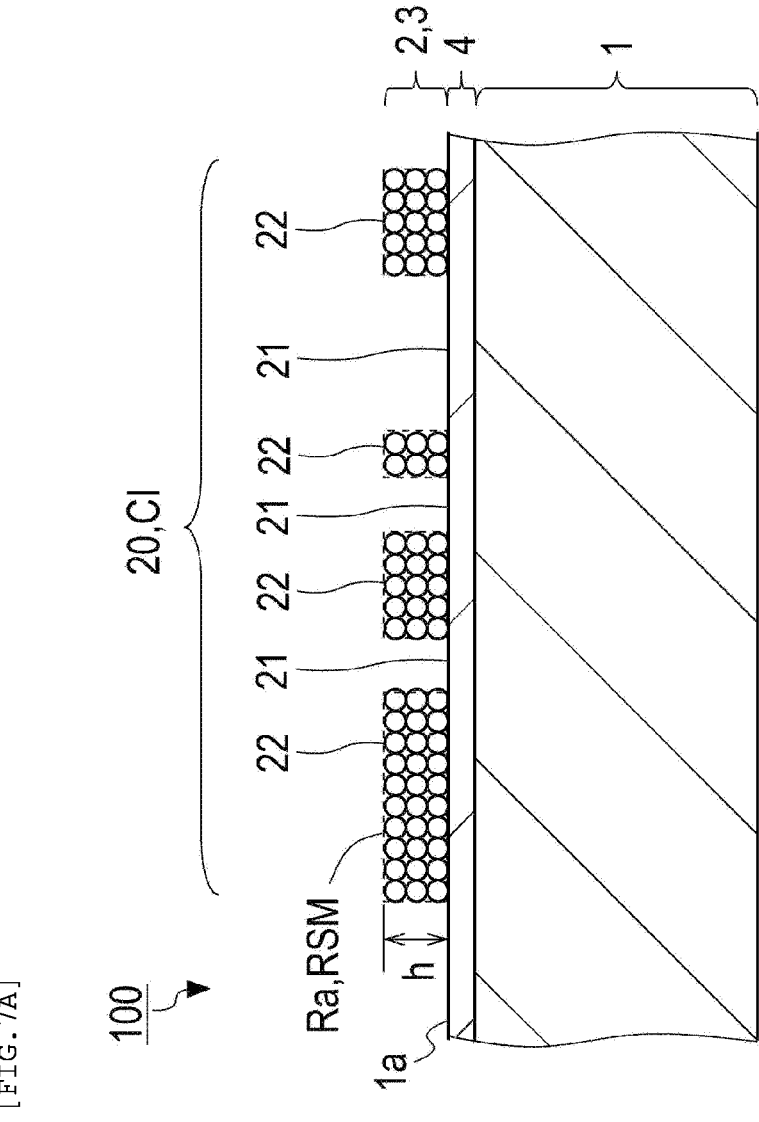
[FIG. 7A]

[FIG. 7B]
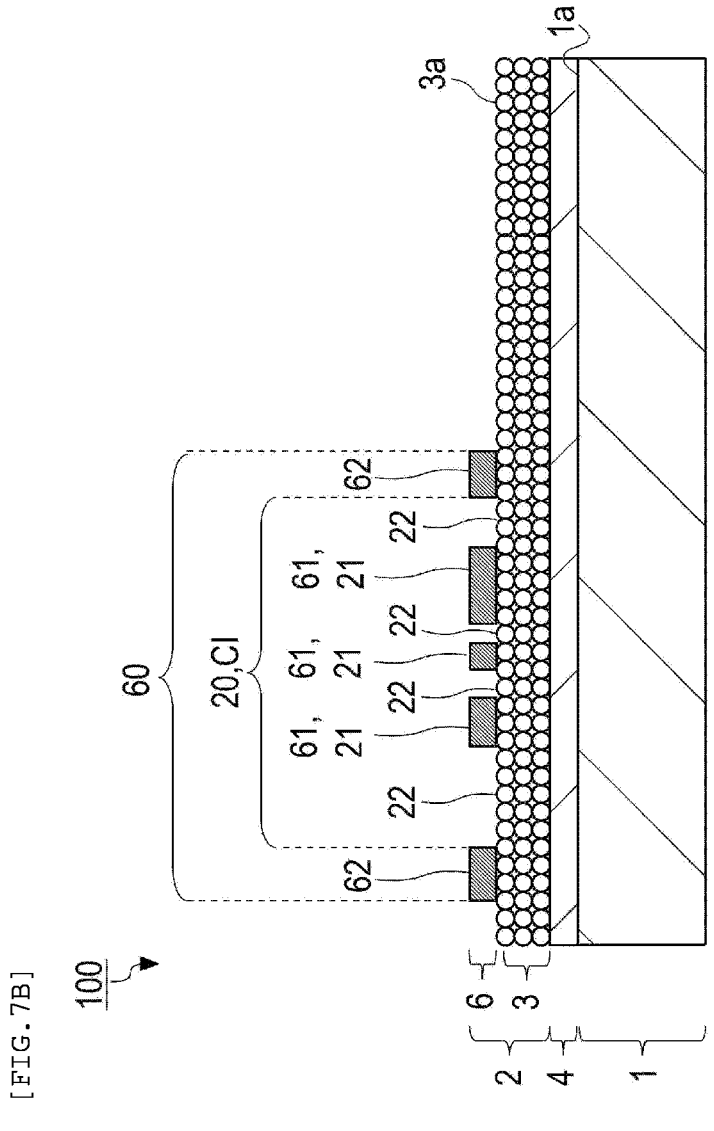

[FIG.8]
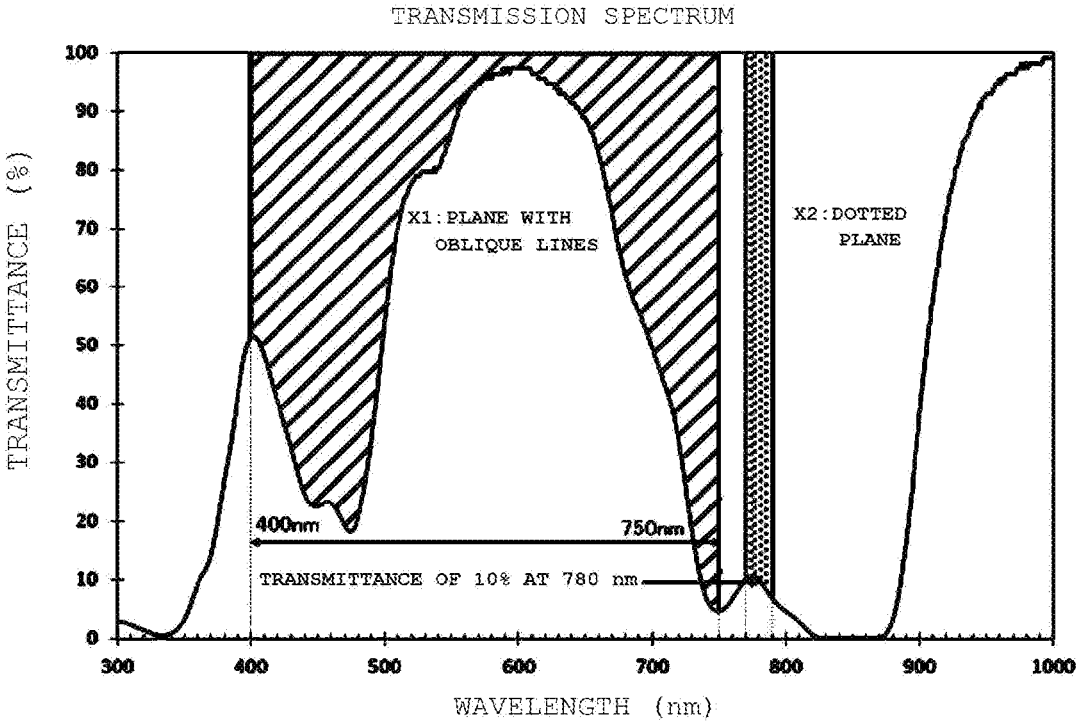

[FIG.9]
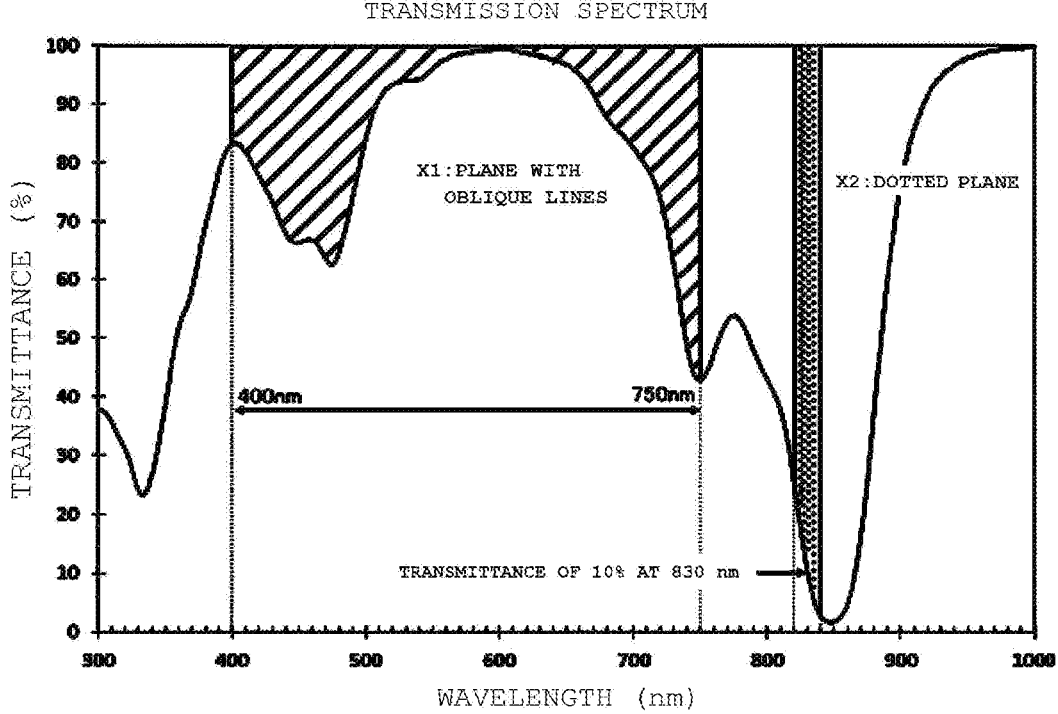

[FIG.10]
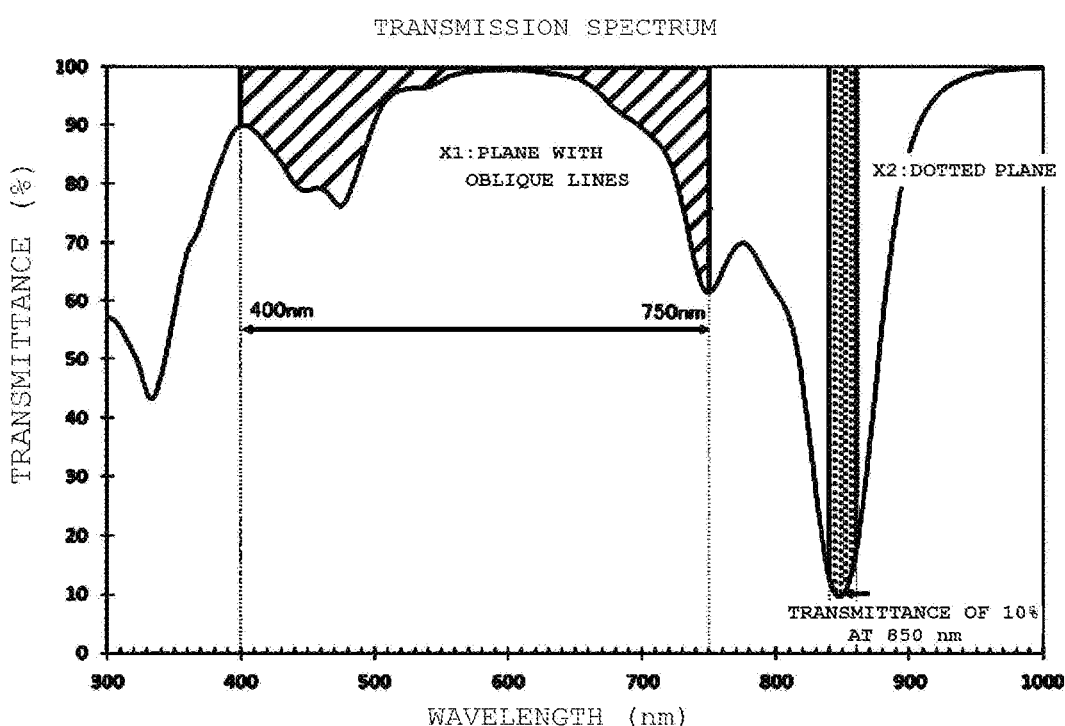

[FIG. 11]
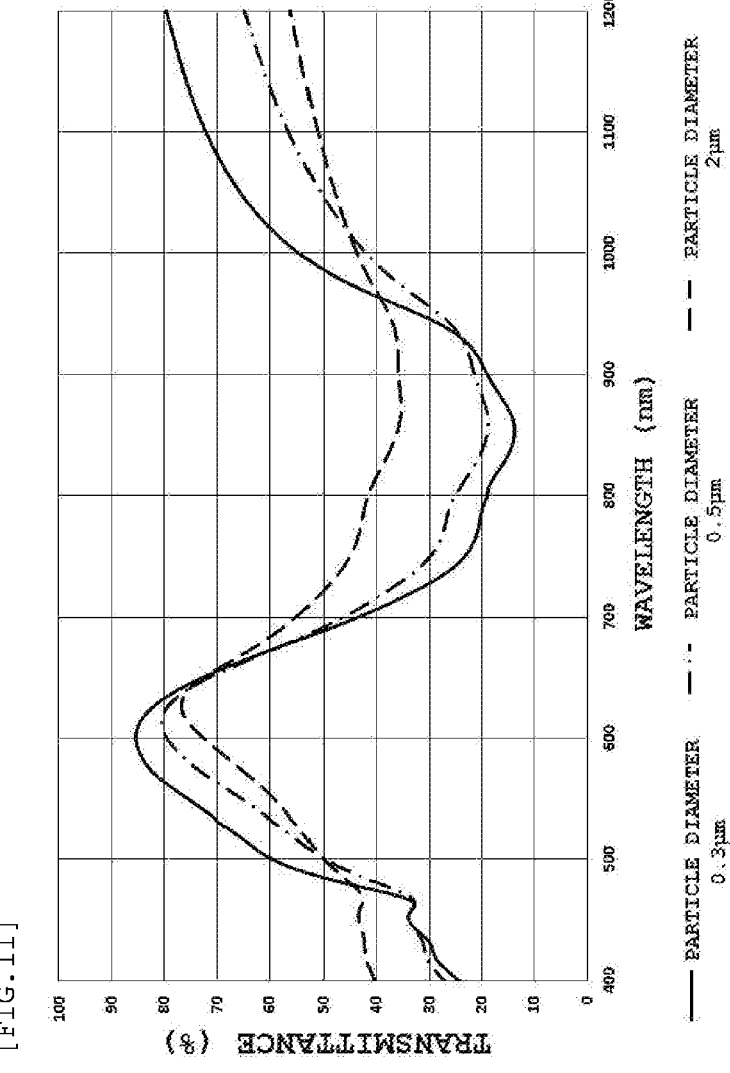

[FIG.12]
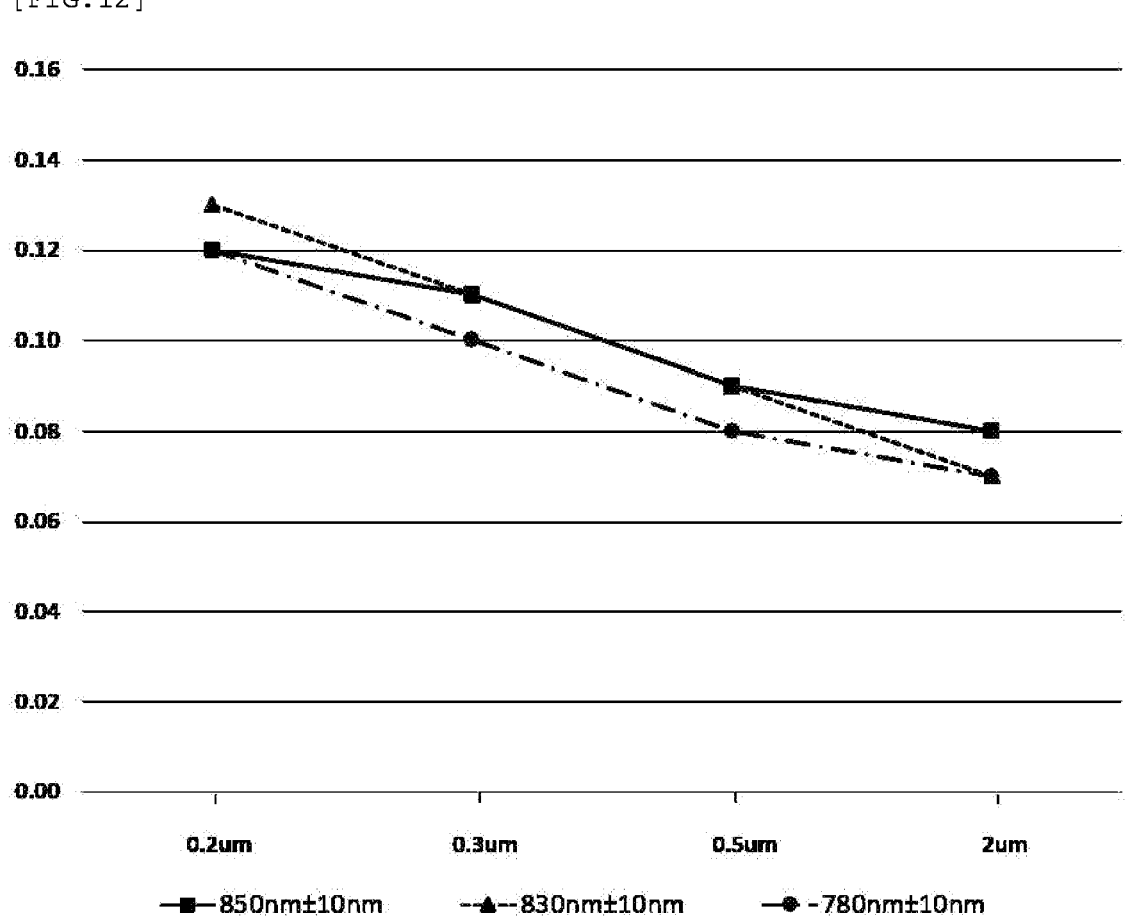

[FIG.13]
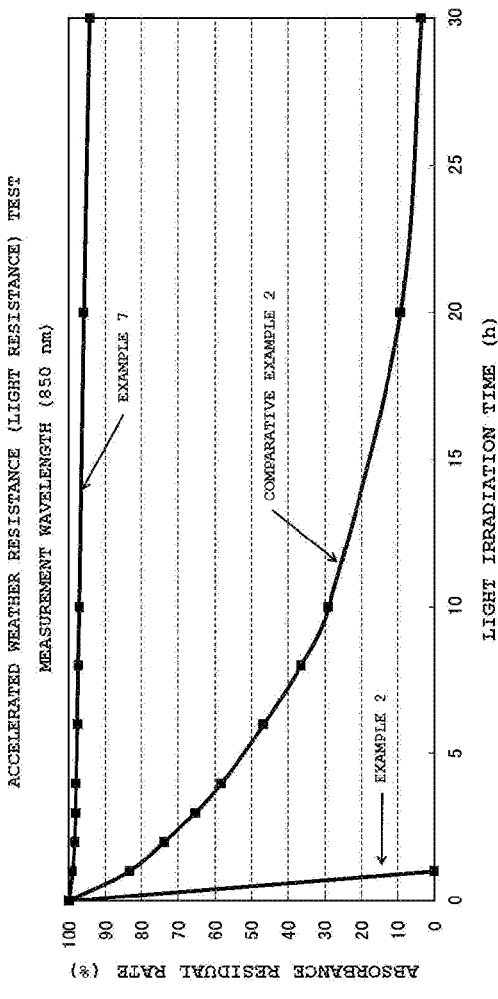

PRINTED MATERIAL

TECHNICAL FIELD

The present invention relates to a printed material.

BACKGROUND ART

For the purpose of ensuring the security of documents and embedding additional data, there is known a technique for printing characters or the like with an infrared ray absorbing material, irradiating the printed matter with infrared rays, and reading the characters and the like printed with the infrared ray absorbing material.

As such a technique, there is, for example, an image forming apparatus that forms a code image on a recording printed material using a printing toner (an IR toner) in which a near infrared ray absorbing material is used, for the purpose of preventing unauthorized copying (for example, See Patent Document 1).

RELATED DOCUMENT

Patent Document

[Patent Document 1] Japanese Unexamined Patent Publication No. 2019-117352

SUMMARY OF THE INVENTION

Technical Problem

In recent years, security interest has increased, and in various fields, there is a demand for a technique for embedding, in a printed material, information (characters, codes, or the like) invisible to humans. In particular, in a case where invisible information (characters, codes, or the like) is provided on a printed material using a near infrared ray absorbing material, there has been a demand for a technique capable of stably recognizing the information.

The present invention has been made in consideration of such circumstances described above, and an object of the present invention is to provide a technique for stably recognizing invisible information provided on a printed material using a near infrared ray absorbing material.

Solution to Problem

According to the present invention, there is provided a printed material including a base substance, a near infrared ray absorbing layer that is provided on the base substance and contains a near infrared ray absorbing material, and a code shape that is formed in a predetermined shape by the near infrared ray absorbing layer or by a shielding layer that covers a part of the near infrared ray absorbing layer and that outputs code information, upon irradiation with a near infrared ray, as reflected light of the near infrared ray, in which in the near infrared ray absorbing material, in a case where an integral value of transmittance of visible light at 400 nm to 750 nm is denoted as a first integral value X1, and an integral value of transmittance in a 20 nm width that is centered on a predetermined wavelength $\lambda$ of the near infrared ray is denoted as a second integral value X2, a ratio R=X2/X1 between the second integral value X12 and the first integral value X1 is 0.09 or more.

Advantageous Effects of Invention

According to the present invention, it is to realize a technique for stably recognizing invisible information provided on a printed material using a near infrared ray absorbing material.

BRIEF DESCRIPTION OF THE DRAWINGS

FIG. 1 is a view for explaining an outline of operations carried out by a printed material in which invisible information is embedded and a device that reads the information in the first embodiment.

FIG. 2A is a plan view of the printed material in the first embodiment.

FIG. 2B is a plan view of the printed material in the first embodiment.

FIG. 3A is a cross-sectional view of the printed material in the first embodiment.

FIG. 3B is a cross-sectional view of the printed material in the first embodiment.

FIG. 4A is a view for explaining a state of the absorption and reflection of near infrared rays in a code shape in the first embodiment.

FIG. 4B is a view for explaining a state of the absorption and reflection of near infrared rays in the code shape in the first embodiment.

FIG. 5 is a view for explaining a manufacturing method for a printed material in the first embodiment.

FIG. 6 is a view for explaining the manufacturing method for a printed material in the first embodiment.

FIG. 7A is a cross-sectional view of a printed material in the second embodiment.

FIG. 7B is a cross-sectional view of a printed material in the second embodiment.

FIG. 8 is a view showing a transmission spectrum in Example 9, where the transmission spectrum (T %) is measured at a sampling interval of 1 nm in a range of wavelengths from 300 nm to 1,000 nm, and the transmittance at 780 nm is 10%.

FIG. 9 is a view showing a transmission spectrum in Example 9, where the transmission spectrum (T %) is measured at a sampling interval of 1 nm in a range of wavelengths from 300 nm to 1,000 nm, and the transmittance at 830 nm is 10%.

FIG. 10 is a view showing a transmission spectrum in Example 9, where the transmission spectrum (T %) is measured at a sampling interval of 1 nm in a range of wavelengths from 300 nm to 1,000 nm, and the transmittance at 850 nm is 10%.

FIG. 11 is a graph showing a difference in a spectral distribution of light transmittance depending on the particle diameter in Examples.

FIG. 12 is a graph showing the ratio R (=X2/X1) for each particle diameter in Examples.

FIG. 13 is a graph showing test results of accelerated weather resistance of near infrared ray absorbing materials in Examples.

DESCRIPTION OF EMBODIMENTS

A configuration of a printed material according to the present invention is not particularly limited. However, in general, the printed material includes a printed material consisting of a code shape, which is provided to include a base substance and a near infrared ray absorbing material (a first embodiment) and a printed material including an interposition layer between the surface of the base substance and a print layer provided to contain the near infrared ray absorbing material (a second embodiment).

First Embodiment

With reference to the drawings, the first embodiment will be described according to an outline of the reading operation for the code information superimposed on the code shape provided to contain the near infrared ray absorbing material.

FIG. 1 is a view for explaining an operation example in which an invisible code shape 20 printed on a printed material 100 is read with a reading device 90, according to this embodiment.

FIG. 2A and FIG. 2B are plan views of the printed material 100, where the code shape 20 is provided in a lower left region of the printed material 100 having a rectangular plate shape in a case of being viewed from above. FIG. 2A (a) and FIG. 2B (a) show a normal invisible state, and FIG. 2A (b) and FIG. 2B (b) schematically show a state visualized by carrying out irradiation with the light of near infrared rays (denoted as IR in the figure). That is, they show a state read by the reading device 90 in a case where irradiation is carried out with the light of near infrared rays.

The printed material 100 has, for example, a plate shape such as paper, glass, a resin, or the like, and has the code shape 20 printed on one surface (here, a surface 1a).

It is noted that although a portable type is shown as the reading device 90, it may be a type which is fixed to the device or may be, instead of a dedicated device, a type in which an IR reading function is provided in a general-purpose terminal such as a mobile terminal (a tablet device, a smartphone, or the like).

The light of near infrared rays to be irradiated is not particularly limited. However, in a case of assuming irradiation with a semiconductor laser, the wavelength of the light of near infrared rays is assumed to be, for example, 780 nm, 830 nm, and 850 nm, considering the introduction cost and marketability. That is, semiconductor lasers equipped in the reading device 90, which output the above wavelengths (780 nm, 830 nm, and 850 nm), are widely used and thus are suitable from the viewpoint of cost and technical stability.

First, the outline of the reading operation for the code information CI superimposed on the code shape 20 will be described in detail with reference to FIGS. 1 and 2A.

The code shape 20 has a near infrared ray absorbing layer 3 (see FIG. 3A) and is in an invisible state at the time of being observed under visible light in a state where the irradiation with light of near infrared rays is not carried out (hereinafter referred to as "at a normal time" for convenience), where the code information CI superimposed on the code shape 20 emerges to be recognized in a case where the irradiation with light of near infrared rays is carried out.

The color of the state where only the code shape 20 is printed on the surface 1a of the printed material 100 (that is, the base color of the printed material 100) is, for example, white. In other words, since the code shape 20 is formed of a near infrared ray absorbing layer which is invisible, the base color of the original printed material 100 is recognized as the color of the printed material 100 even in a case where the code shape 20 is formed.

The applied light of near infrared rays is absorbed in a region in which the near infrared ray absorbing material is provided, in the near infrared ray absorbing layer region of the code shape 20, and it is reflected and returns to the reading device 90 as reflected light (denoted as RR in FIG. 1) in a region in which the near infrared ray absorbing material is not provided.

It is noted that the reading device 90 recognizes the level of the light applied to a portion of the near infrared ray absorbing material as "LOW (hereinafter, described as "black")" and recognizes the level of the light applied to the other region as "High (hereinafter, described as "white"), and it displays the recognition results (white/black obtained by binarizing High/Low) on a display unit 91 as the code information CI (the two-dimensional code or the like). In other words, the image indicated by "black" and "white" becomes the code information CI, and the code shape 20 is read by the predetermined reading device 90, whereby the code information CI superimposed on the code shape 20 is obtained.

The code information CI can represent, for example, a bar code, a two-dimensional code (for example, a QR code (registered trade name)), a combination of numbers/characters/symbols, and an engraved mark of a product. It is noted that the illustrations in the present specification show an example of the two-dimensional code.

Further, the structure of the code shape 20 will be described.

FIG. 3A is a cross-sectional view of the printed material 100 and is a cross-sectional view taken along a line X1-X1 in FIG. 2A (a). FIG. 4A is an enlarged view of a region A1 in FIG. 3A.

The printed material 100 has a base substance 1 and a near infrared ray absorbing layer 3 provided on one surface (here, the surface 1a) of the base substance 1 according to a printing technique.

It is noted that, for convenience, the near infrared ray absorbing layer 3 is shown as a figure in which circles having the same diameter are stacked.

The base substance 1 may be any member having at least one printable flat surface, such as a plate-shaped member, for example, paper, glass, or a resin.

Examples of the printing technique (printing method) include, as plate printing, letterpress printing (relief printing), offset printing (planographic printing), gravure printing (intaglio printing), and screen printing (stencil printing). In addition, regarding a plateless printing on-demand printing method, for example, in laser printing, inkjet printing, or thermal transfer printing, it is possible to select an image forming apparatus that is easily available in the market, according to the kind of the printed material 100 as a printing target.

It is noted that the near infrared ray absorbing layer provided according to a printing technique may be provided to cover the entire region in which the code shape 20 is provided in a case of being provided to cover only the region in which the code shape 20 is provided on the base substance 1 (hereinafter, as necessary, the former will be described as a "1-A embodiment", and the latter will be described as a "1-B embodiment").

Since the outline of the reading operation of the code information CI is described with reference to FIG. 2A, FIG. 3A, and FIG. 4A, the description will be made regarding the "1-A embodiment" in which the near infrared ray absorbing layer 3 is provided to cover only the region where the code shape 20 is provided. It is noted that a print layer 2 in the "1-A embodiment" means a layer formed from the near infrared ray absorbing layer 3 provided on the surface 1a of the base substance 1.

Next, the outline of the reading operation of the code information CI in the "1-B embodiment" in which the near infrared ray absorbing layer 3 is provided to cover the entire region in which the code shape 20 is provided will be described with reference to FIG. 2B, FIG. 3B, and FIG. 4B.

To describe the structure of the code shape 20, FIG. 3B is a cross-sectional view of the printed material 100 and is a cross-sectional view taken along a line X1-X1 in FIG. 2B (a). FIG. 4B is an enlarged view of a region A1 in FIG. 3B.

The printed material 100 has the base substance 1 and the print layer 2 that is provided on one surface (here, the surface 1a) of the base substance 1 according to a printing technique. The print layer 2 has the near infrared ray absorbing layer 3 provided on the surface 1a of the base substance 1, and the above-described shielding layer 6 provided thereon.

The near infrared ray absorbing layer 3 is transparent, and here, it is provided with the solid painting by printing in a region of about 40% of the lower side of the surface 1a of the base substance 1 in a case of being viewed in a plan view. The range in which the near infrared ray absorbing layer 3 is provided is not limited to the above-described range, and it may be, for example, the entire surface 1a of the base substance 1 or may be a region of the lower right quarter of the surface 1a. In any case, it suffices that the region is large enough to properly provide the code shape 20.

The near infrared ray absorbing layer 3 is in an invisible state at the time of being observed under visible light without the irradiation with light of near infrared rays (hereinafter referred to as "at a normal time" for convenience), where the color of the layer (that is, the surface 1a of the base substance 1) in which the near infrared ray absorbing layer 3 is provided is observed. In a case where the near infrared ray absorbing layer 3 is irradiated with the light of near infrared rays, the light of near infrared rays is absorbed, and thus the near infrared ray absorbing layer 3 is observed to be black.

The color of the state where only the near infrared ray absorbing layer 3 is printed on the surface of the printed material 100 (that is, the base color of the printed material 100) is, for example, white. In other words, since the near infrared ray absorbing layer 3 is formed of the near infrared ray absorbing material which is almost colorless, the original base color (here, white) of the printed material 100 is recognized as the color of the printed material 100 even in a case where the near infrared ray absorbing layer 3 is formed.

Next, the shielding layer 6, which contains a material that reflects light of near infrared rays, reflects, for example, 80% or more of the applied light of near infrared rays. The light of near infrared rays applied from the reading device 90 is reflected at a reflection part 21 (a code mask part 61 which will be described later) and is absorbed in an absorption part 22.

The shielding layer 6 has the code mask part 61 and an outer frame mask part 62. The code shape 20 is composed of the reflection part 21 from the code mask part 61 and the absorption part 22 formed from the near infrared ray absorbing layer 3 that is not covered by the code mask part 61.

The code mask part 61 is a part that forms the code shape 20, and it is, for example, a square region in a case of being viewed from above. It is provided as an aggregate of a plurality of the reflection parts 21 corresponding to portions (cells) recognized as "white" of the code information CI.

The outer frame mask part 62 is a region that allows the region of the code mask part 61 (that is, the code shape 20) to be clearly distinguished and recognized from the region outside thereof. It is noted that the outer frame mask part 62 is not necessary in a case where a predetermined "cut-out cell" is formed in the code shape 20 and the outer shape portion of the code shape 20 can be clearly distinguished.

The shielding layer 6 consists of, for example, a printing material that has been adjusted to the same color as the base color of the base substance 1. The printing material is selected according to the kind of printing. In terms of kind, the printing material is a material that contains a pigment, a dye, and a binder resin, does not have a near infrared ray absorbing material, and reflects light of near infrared rays at a predetermined reflectivity (for example, 80% or more) although it can further contain other components as necessary. As a result, the code shape 20 (the code information CI) is not recognized at the time of being observation under visible light (that is, at a normal time) even in a case where the shielding layer 6 is provided on the transparent near infrared ray absorbing layer 3.

The light of near infrared rays applied by the reading device 90 is reflected at the shielding layer 6 (the code mask part 61) in the region of the code shape 20, becomes reflected light (denoted as "RR" in the drawing), and is absorbed by the near infrared ray absorbing material, in the region in which the shielding layer 6 is not formed.

Regarding a reading method, the reading device 90 recognizes the level of the light applied to a portion of the near infrared ray absorbing material as "black" and recognizes the light level of the reflected light that has been irradiated to the shielding layer 6 (the code mask part 61) and returned as "white", and then the recognition results (white/black) are displayed on the display unit 91 as the code information CI (the two-dimensional code or the like).

<Near Infrared Ray Absorbing Layer>

The near infrared ray absorbing layer 3 provided according to a printing technique will be described. A printing material for providing the code shape 20 on the base substance 1 by an on-demand printing technique is selected according to the kind of printing. In terms of kind, the printing material contains a pigment, a dye, and a binder resin, and further contains, as necessary, other components. However, any materials shown below may be used.

Here, for convenience, a printing material composed of a pigment and a dye, which has a near infrared ray absorbing function, is referred to as a "near infrared ray absorbing material".

The binder resin is not particularly limited, and all known binder resins in the related art can be used.

Examples thereof include a styrene-based resin such as styrene, α-methylstyrene, chlorostyrene, a styrene-propylene copolymer, a styrene-butadiene copolymer, a styrene-vinyl chloride copolymer, a styrene-vinyl acetate copolymer, a styrene-maleic acid copolymer, a styrene-acrylic acid ester copolymer, a styrene-methacrylic acid ester copolymer, or a styrene-acrylonitrile-acrylic acid ester copolymer, a polyester resin, a vinyl chloride resin, a rosin-modified maleic acid resin, a phenolic resin, an epoxy resin, a polyethylene resin, a polypropylene resin, an ionomer resin, a polyurethane resin, a silicone resin, a ketone resin, a xylene resin, a petroleum-based resin, and a hydrogenated petroleum-based resin. One kind of these may be used alone, or two or more kinds thereof may be used in combination. Among these, a styrene-based resin and a polyester resin, which contain an aromatic compound as a constitutional unit, are preferable, and a polyester resin is more preferable.

A polyester resin is obtained by a generally known polycondensation reaction between an alcohol and an acid.

Examples of the alcohol include diols such as polyethylene glycol, diethylene glycol, triethylene glycol, 1,2-propylene glycol, 1,3-propylene glycol, 1,4-propylene glycol, neopentyl glycol, and 1,4-butenediol, etherified bisphenols such as 1,4-bis(hydroxymethyl)cyclohexane, bisphenol A, hydrogenated bisphenol A, polyoxyethylenated bisphenol A, and polyoxypropylenated bisphenol A, divalent alcohol unit bodies obtained by substituting these with a saturated or unsaturated hydrocarbon group having 3 to 22 carbon atoms, other divalent alcohol unit bodies, and high alcohol monomers which are trihydric or higher hydric such as sorbitol, 1,2,3,6-hexanetetrol, 1,4-sorbitan, pentaerythritol dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. One kind of these may be used alone, or two or more kinds thereof may be used in combination.

The acid is not particularly limited and can be appropriately selected according to the intended purpose; however, a carboxylic acid is preferable.

Examples of the carboxylic acid include monocarboxylic acids such as palmitic acid, stearic acid, and oleic acid, maleic acid, fumaric acid, mesaconic acid, citraconic acid, terephthalic acid, cyclohexanedicarboxylic acid, succinic acid, adipic acid, sebacic acid, malonic acid, divalent organic acid monomers obtained by substituting these with a saturated or unsaturated hydrocarbon group having 3 to 22 carbon atoms, anhydrides of these acids, dimers of lower alkyl esters and linoleic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, trivalent or higher valent polycarboxylic acid monomers such as anhydrides of these acids, such as 1,3-dicarboxyl-2-methyl-2-methylenecarboxypropane, tetra(methylenecarboxyl)methane, and 1,2,7,8-octanetetracarboxylic acid enol trimer acid. One kind of these may be used alone, or two or more kinds thereof may be used in combination.

It is noted that the binder resin can also include a crystalline resin.

The crystalline resin is not particularly limited as long as the crystallinity is provided, and it can be appropriately selected according to the intended purpose. Examples thereof include a polyester resin, a polyurethane resin, a polyurea resin, a polyamide resin, a polyether resin, a vinyl resin, and a modified crystalline resin. One kind of these may be used alone, or two or more kinds thereof may be used in combination. Among these, a polyester resin, a polyurethane resin, a polyurea resin, a polyamide resin, or a polyether resin is preferable, and a resin having at least one of a urethane skeleton and a urea skeleton is preferable in order to impart moisture resistance and incompatibility with an amorphous resin which will be described later.

The pigment and the dye, which have a near infrared ray absorbing function are not particularly limited whether they are organic materials or inorganic materials.

In addition, they are not particularly limited as long as they are materials satisfying that in a case where an integral value of transmittance of visible light at 400 nm to 750 nm is denoted as a first integral value X1, and an integral value of transmittance in a 20 nm width that is centered on a predetermined wavelength λ of the near infrared ray is denoted as a second integral value X2, a ratio $R=X2/X1$ between the second integral value X2 and the first integral value X1 is 0.09 or more. The integral value X1 and the integral value X2 will be described later.

As the inorganic material, it is possible to use, for example, glass obtained by adding materials such as a transition metal ion and a dye consisting of inorganic and/or organic compound, to a known glass network-forming component that transmits wavelengths in the visible range, such as phosphoric acid, silica, or boric acid, or crystallized glass obtained by crystallizing this glass by a heat treatment.

These inorganic materials reflect well the light in the visible range, which enables the acquisition of the invisible image; however, an organic material is preferable from the viewpoint of ease of printing.

As the organic material, it is possible to use a cyanine-based compound, a phthalocyanine-based compound, a naphthalocyanine-based compound, an anthraquinone-based compound, a dithiol-based nickel complex, an aluminum salt-based compound, or the like.

It is noted that in the present specification, for example, the "naphthalocyanine-based compound" means that it is a general term for a metal naphthalocyanine compound having a substituent, a metal-free naphthalocyanine compound having a substituent, a metal naphthalocyanine compound having no substituent, and a metal-free naphthalocyanine compound having no substituent.

Each of these compounds exhibits the ability to favorably absorb near infrared rays. Specifically, it has the maximum absorption characteristic (the maximum absorption wavelength) in a range of 700 nm to 900 nm in the absorption distribution. More specifically, it is a material that satisfies the physical properties described above, and it is a material that enables the favorable absorption at wavelengths of light of near infrared rays emitted from a semiconductor laser, for example, 780 nm, 830 nm, and 850 nm, where it has a low absorption characteristic in the visible light range (for example, 400 nm to 750 nm). Therefore, in the printed material 100 printed with near infrared ray absorbing materials composed of these compounds, the printed portion cannot be visually recognized.

In particular, a phthalocyanine-based compound and a naphthalocyanine-based compound have a more preferred near infrared absorption performance as the near infrared ray absorption performance.

Specifically, a more preferred compound is a vanadyl naphthalocyanine compound which may have, as a substituent, one or more of a nitro group, a substituted or unsubstituted alkyl group, a substituted or unsubstituted aryl group, and a substituted or unsubstituted alkylamino group, and a copper naphthalocyanine compound which may have, as a substituent, one or more of a nitro group, a substituted or unsubstituted alkyl group, a substituted or unsubstituted aryl group, and a substituted or unsubstituted alkylamino group. More specifically, a particularly preferred compound is a vanadyl naphthalocyanine compound which may have, as a substituent, one or more of a nitro group, a substituted or unsubstituted alkyl group, a substituted or unsubstituted aryl group, and a substituted or unsubstituted alkylamino group.

In a case of being exposed to atmospheric air, ultraviolet rays, or the like, the performance of the organic material deteriorates; however, the organic material can be allowed to function as the printed material 100 without taking any particular measures against the deterioration in a case where the speed of the deterioration is slow. Therefore, among the phthalocyanine-based compounds and the naphthalocyanine-based compounds, a pigment-based compound having no substituent has favorable performance from the viewpoint of weather resistance (durability).

That is, the printed material 100 containing the near infrared ray absorbing material and having the code information CI printed thereon can maintain the function thereof.

The numerical value range of the content of each of the pigment and the dye, which have near infrared ray absorbing function varies depending on the characteristics of each of the pigment and the dye, which have near infrared ray absorbing function. However, regardless of the kind of content, the absorption of light of near infrared rays is not sufficient in a case where the content is insufficient.

A component other than the pigment and the dye, which have a near infrared ray absorbing function, is not particularly limited as long as it is generally contained in a printing ink (including a toner), where the component can be appropriately selected according to the intended purpose, and examples thereof include a mold release agent, a charge control agent, and an external additive.

Further, the thickness T1 of the near infrared ray absorbing layer 3 will be described.

First, the thickness T1 of the near infrared ray absorbing layer 3 in the "1-A embodiment" will be described in detail with reference to FIG. 3A and FIG. 4A.

Although the thickness T1 is not particularly limited, the lower limit thereof is, for example, 0.1 μm or more, preferably 0.3 μm or more, and more preferably 0.5 μm or more. In addition, the upper limit thereof is, for example, 20 μm or less, preferably 15 μm or less, and more preferably 10 μm or less.

In a case of increasing the thickness T1, it is possible to increase the absorption amount (the absorbance) of the light of near infrared rays. On the other hand, in a case of increasing the thickness T1, a part of the light of near infrared rays or the reflected light, which is applied to the reflection part 21, is taken into the inside of the near infrared ray absorbing layer 3 from the side surface thereof. In a case where the amount of light of near infrared rays or the reflected light, which is taken into the inside, is large, the light level of the reflected light that reaches the reading device 90 is reduced. That is, the contrast is reduced.

Then, in a case of setting the thickness T1 within the range described above, it is possible to optimize the balance between the amount of light absorbed at the absorption part 22 and the amount of light reflected at the reflection part 21 and reaching the reading device 90.

That is, the reading device 90 can acquire the code information CI with a high contrast, and as a result, the area of the code shape can be reduced, whereby extremely high confidentiality can be realized in a case where a desired amount of information is superimposed on the code information CI. Further, even with the same area, a larger amount of information can be superimposed on the code information CI.

Further, in a case where the thickness T1 is increased, due to the unevenness of the code shape 20, there is also a possibility that the presence of the code shape 20 can be easily recognized even at a normal time during which the light of near infrared rays is not applied. Accordingly, in a case of being set to the above-described range, it is possible to make it difficult to recognize the presence of the code shape 20 at a normal time.

In addition, in a state where only the code shape 20 is printed, the printed material 100 has the base color (for example, white), and no image is added thereto, and thus the code shape 20 is not particularly concerned. However, in a case where another image is printed on the code shape 20 (see an image layer 5 in FIG. 5(c) for explaining a manufacturing method described later), the presence of the code shape 20 is easily recognized since the unevenness is large and the state of the printing of the code shape 20 is different from the desired state.

However, in a case of setting the thickness T1 within the above range, it is possible to realize a sufficiently high print quality even in a case where the printed material 100 on which the code shape 20 is formed is subjected to another printing and used. That is, the presence of the code shape 20 is not noticed.

The longitudinal surface roughness Ra of the near infrared ray absorbing layer 3 is 0.5 μm or less, preferably 0.4 μm or less, and more preferably 0.3 μm or less. The lower limit thereof is not particularly limited; however, assuming a generally feasible range, it is 0.05 μm or more.

In a case of setting the surface roughness Ra to 0.5 μm or less, it is possible to stabilize the recognition accuracy of the code information CI at a high level.

In addition, the lateral surface roughness RSm is 0.5 μm or less, preferably 0.4 μm or less, and more preferably 0.3 μm or less. The lower limit thereof is not particularly limited; however, assuming a generally feasible range, it is 0.05 μm or more.

In a case of setting the surface roughness RSm to 0.5 μm or less, it is possible to stabilize the recognition accuracy of the code information CI at a high level.

In particular, in a case of setting the surface roughness RSm to 0.4 μm or less, it is presumed that the light of near infrared rays enters the inside of the near infrared ray absorbing layer 3 and is absorbed by the near infrared ray absorbing material without being reflected at the incident surface (that is, the surface 3a of the near infrared ray absorbing layer 3) and without depending on the incident angle of the light of near infrared rays.

In addition, in a case where the image layer 5 (see FIG. 5(c)) is provided on the near infrared ray absorbing layer 3 by the printing or the like, a high print quality can be realized. In other words, even in a case where the image layer 5 is provided on the code shape 20, the print quality of the image layer 5 can be improved, and thus the presence of the code shape 20 and the shape itself thereof is not estimated from the unevenness or the like of the image layer 5, whereby high security can be realized.

Next, the thickness T1 of the near infrared ray absorbing layer 3 in the "1-B embodiment" will be described in detail with reference to FIG. 3B and FIG. 4B.

Although the thickness T1 is not particularly limited, the lower limit thereof is, for example, 0.1 μm or more, preferably 0.3 μm or more, and more preferably 0.5 μm or more. The upper limit value thereof is, for example, 20 μm or less, preferably 15 μm or less, and more preferably 10 μm or less.

In a case of increasing the thickness T1, it is possible to increase the absorption amount (the absorbance) of the near infrared ray IR. That is, the level of the reflected light RR recognized as "black" by the reading device 90 can be made lower (a LOW level). It is noted that in this embodiment, the near infrared ray absorbing layer 3 is preferably thinner from the viewpoint of cost since it is solidly painted on the surface 1a of the base substance 1. By the way, in a case of setting the thickness T1 of the near infrared ray absorbing layer 3 within the above-described range, it is possible to achieve a balance between the realization of a desired black level (a LOW level) and the cost.

The longitudinal surface roughness Ra and the lateral surface roughness RSm of the near infrared ray absorbing layer 3 are the same as those described in the "1-A embodiment" described above, and the preferred ranges thereof are also the same.

The lower limit of the thickness T2 of the shielding layer 6 provided on the near infrared ray absorbing layer 3 is, for example, 0.1 μm or more, preferably 0.3 μm or more, and more preferably 0.5 μm or more. The upper limit value thereof is, for example, 20 μm or less, preferably 15 μm or less, and more preferably 10 μm or less.

In a case of increasing the thickness T2 to increase the unevenness, a high contrast can be obtained. On the other hand, it is desirable to decrease the thickness T2 from the viewpoint of decreasing the unevenness due to the shielding layer 6 to avoid being recognized at a normal time. Accordingly, in a case of setting the thickness T2 within the above-described range, it is possible to avoid being recognized at a normal time while achieving a high contrast. That is, in a case where a desired amount of information is superimposed on the code information CI that is realized by the code shape 20 (the code mask part 61), the area of the code shape 20 can be reduced, and thus extremely high confidentiality can be realized. In addition, even with the same area, a larger amount of information can be superimposed on the code information CI.

In addition, in a state where only the code shape 20 is printed, the printed material 100 has the base color (for example, white), and no image is added thereto, and thus the code shape 20 is not particularly concerned. However, in a case where another image is printed on the code shape 20, a case where the unevenness is large causes the state of the printing of the code shape 20 to be different from the desired state, and thus the presence of the code shape 20 is easily recognized. So, in a case of setting the thickness T2 within the above range, it is possible to realize a sufficiently high print quality even in a case where the printed material 100 on which the code shape 20 is formed is subjected to another printing and used. That is, the presence of the code shape 20 is not noticed.

In addition, in a case where the shielding layer 6 is provided on the near infrared ray absorbing layer 3, it is possible to realize, with a high print quality, the shielding layer 6, in particular, the code mask part 61. In other words, in a case where the shielding layer 6 is provided by the printing, the surface 3a of the near infrared ray absorbing layer 3 on which the shielding layer 6 is provided is properly flat, and thus a desired print quality is obtained in a case where the shielding layer 6 is printed.

The longitudinal surface roughness Ra of the shielding layer 6 is 0.5 μm or less, preferably 0.4 μm or less, and more preferably 0.3 μm or less. The lower limit thereof is not particularly limited; however, assuming a generally feasible range, it is 0.05 μm or more.

In a case of setting the surface roughness Ra to 0.5 μm or less, it is possible to stabilize the recognition accuracy of the code information CI at a high level.

In addition, the lateral surface roughness RSm of the shielding layer 6 is 0.5 μm or less, preferably 0.4 μm or less, and more preferably 0.3 μm or less. The lower limit thereof is not particularly limited; however, assuming a generally feasible range, it is 0.05 μm or more.

In a case of setting the surface roughness RSm to 0.5 μm or less, it is possible to stabilize the recognition accuracy of the code information CI at a high level. In particular, in a case of setting the surface roughness RSm to 0.5 μm or less, it is possible to suppress, in the reflected light, irregular reflection or reflection in an unsuitable direction, whereby the reflected light reliably returns to the reading device 90. That is, the code information CI that has a high contrast can be obtained.

In addition, in a case where another image is provided on the surface 6a of the shielding layer 6, a desired print quality is obtained for the other image. That is, in a case where another image is provided on the surface 6a of the shielding layer 6, it is possible to prevent the code shape 20 from being recognized at a normal time due to the print quality.

<Transmittance of Near Infrared Ray Absorbing Material>

The "near infrared ray absorbing material" described above will be described focusing on transmittance.

The near infrared ray absorbing material preferably satisfies Expressions (1) and (2).

Expression 1

$$\int_{400}^{750} [100 - T\%] d\lambda = X1 \tag{1}$$

$$\int_{\lambda\ max-10}^{\lambda\ max+10} [100 - T\%] d\lambda = X2 \tag{2}$$

In the near infrared ray absorbing material, the integral value of the transmittance of visible light at 400 nm to 750 nm is denoted as the first integral value X1 (Expression (1)).

Regarding a method of calculating the integral value X1, the integral value X1 is calculated by measuring the transmission spectrum (T %) of the near infrared ray absorbing material, for example, at a sampling interval of 1 nm in a range of wavelengths from 300 nm to 1,000 nm, and integrating the numerical values of "100–transmission spectrum (%)" for each 1 nm in the visible light of 400 nm to 750 nm.

Here, the value of the integral value X1 indicates the color sensation in the visible range, and thus in a case where this value is small, the color sensation (the coloration) is small, and as a result, the invisible near infrared ray absorbing layer 3 is formed. Therefore, even in a case where the code shape 20 is formed, the original base color of the printed material 100 is recognized as the color of the printed material 100. Here, the integral value X1 is preferably 17,000 or less.

The wavelength of the light of near infrared rays is denoted as $\lambda$, and the integral value of the transmittance in a 20 nm width (that is, ±10 nm) that is centered on $\lambda$ is denoted as the second integral value X2 (Expression (2)).

Similar to the method of calculating the integral value X1, regarding a method of calculating the integral value X2, the integral value X2 is calculated by measuring the transmission spectrum (T %) of the near infrared ray absorbing material, for example, at a sampling interval of 1 nm in a range of wavelengths from 300 nm to 1,000 nm, and integrating the numerical values of "100–transmission spectrum (%)" for each 1 nm in the wavelengths in a 20 nm width ($\lambda$±10 nm) that is centered on $\lambda$.

It is noted that the reason for using the integral value in a nm width that is centered on $\lambda$ is as follows.

That is, this is because, in general, the spectral distribution and intensity of the light of near infrared rays have variations and widths. For example, depending on the reading device 90, the intensity of the applied light of near infrared rays may differ, or the reading sensitivity of the reflected light may differ.

The ratio R=X2/X1 between the second integral value X2 and the first integral value X1 is 0.09 or more. The lower limit value of the ratio R is preferably 0.1 or more and more preferably 0.11 or more. The upper limit value of the ratio R is not particularly limited as long as it is a value calculated from the above-described preferred range of 17,000 or less of the integral value X1. In a case of setting the ratio R (=X2/X1) within such a range, the reading device 90 cannot recognize the code information CI in a case where the light of near infrared rays is not applied but can recognize the code information CI only after the light of near infrared rays is applied.

However, as described above, 780 nm, 830 nm, and 850 nm are relatively frequently selected as the wavelength $\lambda$ of the light of near infrared rays. Therefore, it is preferable to satisfy the ratio R (=X2/X1) for any one of these three wavelengths $\lambda$. In a case of satisfying the ratio R (=X2/X1) for all three wavelengths $\lambda$, it is possible to realize the code information CI that has more general-purpose properties.

The particle diameter $D_{50}$ of the near infrared ray absorbing material is 0.05 $\mu$m or more and 1.0 $\mu$m or less. The particle diameter $D_{50}$ is preferably 0.1 $\mu$m or more and 0.5 $\mu$m or less, and the particle diameter $D_{50}$ is more preferably 0.2 $\mu$m or more and 0.4 $\mu$m or less.

In a case where the particle diameter $D_{50}$ is too small, aggregation may easily occur, dispersibility may deteriorate, and the quality of the near infrared ray absorbing layer 3 may deteriorate, and thus it is preferable to satisfy the above-described lower limit value.

As the particle diameter $D_{50}$ increases, the ability to absorb near infrared rays tends to decrease. For example, the spectral distribution of the absorptance (and the corresponding transmittance) appears broadened. By the way, in a case of setting the particle diameter $D_{50}$ within the above-described range, it is possible to realize the code information CI that has a high contrast.

In addition, in a case of setting the particle diameter $D_{50}$ within the above-described range, it is possible to decrease the surface roughnesses Ra and RSm of the near infrared ray absorbing layer 3, improve the print quality, and, as a result, realize a higher contrast. Further, in a case of providing the image layer 5 on the code shape by the printing or the like, it is possible to increase the quality of the printing of the code shape 20 since the code shape 20 has a proper surface roughness range.

In a case where the near infrared ray absorbing material is a pigment, the crystallite size obtained by measuring the crystallite size distribution may be used as an indicator of a state of dispersion, where an analysis method for X-ray diffraction data is used as a method of estimating the crystallite size.

In general, the crystallite refers to a region within a crystal grain, which can be regarded as a single crystal, and thus a crystal grain can be said to be a polycrystal in which a plurality of crystallites are aggregated. As a result, the crystallite size is regarded to be smaller than or almost the same as the particle diameter.

Therefore, in a case where 0.05 $\mu$m, which is the lower limit value as the grain size according to the present invention, is applied to the crystallite size, it is naturally included in 0.05 $\mu$m or less, which is described in the measurement results in terms of the particle diameter, for convenience, in the present invention.

<Manufacturing Method for Printed Material>

First, a manufacturing method for the printed material 100 in the "1-A embodiment" will be described in detail with reference to FIG. 2A and FIG. 5.

As shown in FIG. 5(a), first, the plain base substance 1 on which the code shape 20 or the like is not printed is prepared.

Subsequently, as shown in FIG. 5(b), the absorption part 22 having a desired shape (the code information CI) is provided by the printing in a predetermined region of the surface 1a of the base substance 1. As a result, the printed material 100 having the code shape 20, which is shown in FIG. 2A (a), is obtained.

Further, as shown in FIG. 5(c), the image layer 5 may be provided on the printed material 100, on which the code shape 20 is provided, so that the code shape 20 is covered.

The image layer 5 may be provided by the printing or may be affixed with a sheet member on which an image is provided. It is noted that the image layer 5 is formed of a material having high transmittance of near infrared rays, and 80% or more, more preferably 90% or more, or still more preferably 95% or more of the applied light of near infrared rays is transmitted and reaches the absorption part 22.

Next, a manufacturing method for the printed material 100 in the "1-B embodiment" will be described in detail with reference to FIG. 2B and FIG. 6.

It is noted that similar to FIG. 2B(b), FIG. 6 shows a state where the near infrared rays are applied to carry out observation so that the transparent near infrared ray absorbing layer 3 is easily recognized.

As shown in FIG. 6(a), first, the plain base substance 1 having the surface 1a on which nothing is provided is prepared.

Subsequently, as shown in FIG. 6(b), in a predetermined region of the surface 1a of the base substance 1, here, in a case of being viewed from above (in the plan view of FIG. 6(b)), the near infrared ray absorbing layer 3 is provided with a solid painting by printing in a predetermined region of the lower side (here, a region of about 40%). In this state, as shown in FIG. 6(b), a region of approximately 40% of the lower side of the base substance 1 is recognized as "black" in a case where the light of near infrared rays is applied to carry out observation.

Further, as shown in FIG. 6(c), the shielding layer 6 is provided by the printing on a desired region on the surface 3a of the near infrared ray absorbing layer 3. The code mask part 61 and the outer frame mask part 62 of the shielding layer 6 are provided at the same timing. As a result, the code shape 20 is formed from the code mask part 61. That is, the printed material 100 having the code shape 20 on which the code information CI is superimposed is obtained.

It is noted that, as described above, since the near infrared ray absorbing layer 3 is transparent under visible light, the entire surface of the base substance 1 is recognized as white at a normal time during which the light of near infrared rays is not applied in a case where the surface 1a of the base substance 1 or the shielding layer 6 is "white".

Second Embodiment

The second embodiment will be described with reference to FIG. 7A and FIG. 713. A point of difference from the first embodiment is that a white layer 4 is provided as an interposition layer between the surface 1a of the base substance 1 and the print layer 2 described above.

First, a description will be made with reference to FIG. 7A (the cross-sectional view of the printed material 100) regarding a case where the near infrared ray absorbing layer 2 provided by a printing technique is provided to cover only the region in which the code shape 20 is provided on the base substance 1 (hereinafter, as necessary, the former is referred to as the "2-A embodiment").

In a case where the base substance 1 is, for example, a transparent resin plate such as a polyethylene terephthalate (PET) resin (that is, in a case where the transmittance is high), the applied light of near infrared rays is not sufficiently reflected at the reflection part 21 in which the absorption part 22 is not provided and is transmitted.

In such a case, for example, the white layer 4 (for example, a layer formed by printing) is provided on the surface 1*a* of the base substance 1 in order to increase the reflectivity, and the code shape (the absorption part 22) is provided thereon. As a result, the code information CI can be stably read by the reading device 90. At this time, the reflectivity of the light of near infrared rays in the interposition layer (here, the white layer 4) can be set to, for example, 70% or more, and it is preferably 80% or more and more preferably 90% or more.

Next, a description will be made with reference to FIG. 7B (the cross-sectional view of the printed material 100) regarding a case where the near infrared ray absorbing layer 3 provided by a printing technique is provided to cover the entire region in which the code shape 20 is provided on the base substance 1 (hereinafter, as necessary, the former is referred to as the "2-B embodiment").

There may be a case where the base substance 1 is a transparent resin plate such as a polyethylene terephthalate (PET) resin (that is, in a case where the transmittance is high) or may be a case where it is difficult to adjust the color of the surface 1*a* of the base substance 1 and the color of the shielding layer 6, and thus the shielding layer 6 is easily recognized at a normal time in a case where the color of the surface 1*a* of the base substance 1 remains as the base color, for example, the color thereof is not constant.

In addition, there may be a case where the surface roughness of the surface 1*a* of the base substance 1 is unsuitable for providing the near infrared ray absorbing material layer 3 as it is. Considering such a case, the point is that the white layer 4 is provided as an interposition layer between the near infrared ray absorbing material layer 3 and the base substance 1. It is noted that at this time, the shielding layer 6 is white.

Feature and Effect of Embodiment

The embodiments of the invention have been described as above with reference to the drawings. The features and effects of the embodiments are summarized as follows.

(1) The printed material 100 according to the present embodiment has the absorption part 22 (the near infrared ray absorbing layer 3) that is provided on the base substance 1 to contain a near infrared ray absorbing material, and the code shape 20 that is formed in a predetermined shape from the absorption part 22 or by covering a part of the absorption part 22 and that outputs the code information CI, upon irradiation with light of near infrared rays, as reflected light of the light of near infrared rays, where in the near infrared ray absorbing material, in a case where an integral value of transmittance of visible light at 400 nm to 750 nm is denoted as a first integral value X1, and an integral value of transmittance in a 20 nm width that is centered on a predetermined wavelength $\lambda$ of the near infrared ray is denoted as a second integral value X2, a ratio R=X2/X1 between the second integral value X2 and the first integral value X1 is 0.09 or more.

In a case of setting the ratio R (=X2/X1) within such a range, the reading device 90 cannot recognize the code information CI in a case where the light of near infrared rays is not applied but can recognize the code information CI in a case where the light of near infrared rays is applied. That is, the security of the code information CI can be ensured.

(2) The absorption part 22 (the near infrared ray absorbing layer 3) may be provided on the base substance 1 to cover an entire region in which the code shape 20 is provided. However, in a case where this state is maintained, a recognition operation gives only one black rectangular shape when read by the reading device 90. Therefore, in a case of providing the shielding layer 6 in the region recognized as "white" on the absorption part, the light of near infrared rays is reflected at the shielding layer 6 provided on the absorption part without reaching the absorption part.

As a result, the reading device 90 can recognize the code information CI superimposed on the code shape 20 in terms of "white" and "black".

(3) The integral value X1 is suitably 17,000 or less because in a case where the value is small, the coloration of the near infrared ray absorbing layer is also small, and thus the base color of the printed material is recognized.

(4) The second integral value X2 is calculated in a case where the predetermined wavelength $\lambda$ is at least one of 780 nm, 830 nm, and 850 nm.

Semiconductor lasers equipped in the reading device 90, which output the above wavelengths (780 nm, 830 nm, and 850 nm), are widely used and thus are suitable from the viewpoint of cost and technical stability.

(5) As the near infrared ray absorbing material, an organic material composed of a pigment and a dye is suitably used; however, a naphthalocyanine-based compound has favorable performance from the viewpoint of durability.

(6) As the naphthalocyanine-based compound, a vanadyl naphthalocyanine compound which may have a substituent can be suitably used.

(7) The particle diameter $D_{50}$ of the near infrared ray absorbing material is 0.1 µm or more and 1.0 or less.

As the particle diameter $D_{50}$ of the near infrared ray absorbing material increases, the ability to absorb near infrared rays tends to decrease. For example, the spectral distribution of the absorptance (and the corresponding transmittance) appears broadened, and thus the code information CI that has a high contrast cannot be realized. As a result, it is desirable to set the particle diameter $D_{50}$ within the above-described range.

The embodiments of the present invention have been described above; however, these are examples of the present invention, and thus it is also possible to adopt various configurations other than those described above.

EXAMPLES

Next, the present invention will be described in detail based on examples of near infrared ray absorbing materials. <Near Infrared Ray Absorbing Material>

Near infrared ray absorbing materials that are used in Examples and Comparative Examples are as follows.

[Compound 1] 0.323 g of copper-1-phenyl-2,3-naphthalocyanine (I) was obtained in the same manner as in Synthesis Example 3, except that 0.9 g of copper (I) chloride was used instead of 1.6 g of vanadium (V) trichloride oxide in Synthesis Example 3 of Japanese Unexamined Patent Publication No. 2017-226820.

[Compound 2] The compound described in Example 8 of Japanese Unexamined Patent Publication No. 2001-64255

[Compound 3] The compound described in Example 11 of Japanese Published Patent Application A-H10-88017

[Compound 4] The compound described in the synthesis example of Japanese Published Patent Application A-H10-45785

[Compound 5] 0.323 g of copper-octa-(2,2,3,3-tetrafluoropropoxy)naphthalocyanine (Amax: 842 nm; ε: 140, 000 (in toluene)) (I) was obtained in the same manner as in Example 12, except that 21.9 g of 1,4-bis(2,2,3, 3-tetrafluoropropoxy)-2,3-dicyanonaphthalene was used instead of 16.1 g of 1,4-dibutoxy-2,3-dicyanonaphthalene in Example 12 of Japanese Published Patent Application A-H08-508269.

[Compound 6] The compound described in Synthesis Example 3 of Japanese Unexamined Patent Publication No. 2017-226820

[Compound 7] The compound described in Synthesis Example 1 of Japanese Unexamined Patent Publication No. 2017-226820

[Compound 8] 0.323 g of vanadyl-tetra-n-butoxynaphthalocyanine (Amax: 844 nm; ε: 202,000 (in toluene)) (I) was obtained in the same manner as in Example 1, except that 25 g of 1-n-butoxy-2,3-dicyanonaphthalene was used instead of 25 g of 6-n-butoxy-2,3-dicyanonaphthalene in Example 1 of Japanese Published Patent Application A-S61-215663.

[Compound 9] The compound described in Example 12 of Japanese Published Patent Application A-H08-508269

[Compound 10] 0.323 g of copper-octa-isopentyloxynaphthalocyanine (Amax: 850 nm; ε: 150,000 (in toluene)) (I) was obtained in the same manner as in Example 12, except that 17.5 g of 1,4-diisopentyloxy-2,3-dicyanonaphthalene was used instead of 16.1 g of 1,4-dibutoxy-2,3-dicyanonaphthalene in Example 12 of Japanese Published Patent Application A-H08-508269.

[Compound 11] 0.323 g of copper-octa-isobutoxynaphthalocyanine (Amax: 857 nm; ε: 167,000 (in toluene)) (I) was obtained in the same manner as in Example 12,

[Compound 14] The compound described in Example 6 of Japanese Published Patent Application A-H11-269399

[Compound 15] The compound described in Example 13 of Japanese Published Patent Application A-H08-60008

[Compound 16] 0.323 g of copper-octa-(4-tert-butylphenylthio)-octa(2-ethoxyethoxy)phthalo cyanine (Amax: 777 nm; ε: 93,700 (in toluene)) (I) was obtained in the same manner as in Example 45, except that 252 g of 4,5-bis(4-tert-butylphenylthio)-3,6-bis(2-ethoxyethoxy)phthalonitrile was used instead of 240 g of phthalonitrile derivative in Example of Japanese Published Patent Application A-H07-56019.

<Evaluation Method>

[Integral Value of Transmittance]

Regarding the compounds 1 to 13 (Examples 1 to 13) and compounds 14 to 16 (Comparative Examples 1 to 3), the integral value (X1) of the transmittance of visible light at 400 nm to 750 nm was calculated using Expression (1) described above in a case where the transmittance at each of the wavelengths of 780 nm, 830 nm, and 850 nm was 10%, and the integral value (X2) of the transmittance in a 20 nm width (that is, ±10 nm) that was centered on each of the wavelengths of 780 nm, 830 nm, and 850 nm was calculated using Expression (2) described above, as the wavelength of the light of near infrared rays. Table 1 shows the results of the calculated integral value (X1).

Table 1 also shows the ratio R (=X2/X1) of the integral value (X2) to the integral value (X1) at each of the wavelengths of 780 nm, 830 nm, and 850 nm.

A specific calculation procedure will be described with reference to Example 9 below.

TABLE 1

| | | Ratio R = X2/X1 850 nm ± 10 nm | X1 850 nm | Ratio R = X2/X1 830 nm ± 10 nm | X1 830 nm | Ratio R = X2/X1 780 nm ± 10 nm | X1 780 nm |
|---|---|---|---|---|---|---|---|
| Example 1 | Compound 1 | 0.12 | 15,646 | 0.12 | 15,639 | 0.09 | 20,041 |
| Example 2 | Compound 2 | 0.22 | 8,155 | 0.42 | 4,371 | 0.26 | 7,057 |
| Example 3 | Compound 3 | 0.12 | 15,279 | 0.53 | 3,341 | 0.14 | 13,115 |
| Example 4 | Compound 4 | 0.27 | 7,127 | 0.30 | 6,388 | 0.21 | 8,973 |
| Example 5 | Compound 5 | 0.32 | 5,770 | 0.48 | 3,842 | 0.14 | 13,268 |
| Example 6 | Compound 6 | 0.45 | 3,891 | 0.55 | 3,338 | 0.13 | 14,472 |
| Example 7 | Compound 7 | 0.12 | 15,141 | 0.13 | 15,043 | 0.12 | 16,221 |
| Example 8 | Compound 8 | 0.49 | 3,746 | 0.35 | 5,273 | 0.13 | 14,591 |
| Example 9 | Compound 9 | 0.53 | 3,489 | 0.33 | 5,633 | 0.14 | 13,979 |
| Example 10 | Compound 10 | 0.57 | 3,259 | 0.29 | 6,430 | 0.13 | 14,842 |
| Example 11 | Compound 11 | 0.52 | 3,466 | 0.23 | 8,063 | 0.13 | 14,005 |
| Example 12 | Compound 12 | 0.39 | 4,686 | 0.18 | 10,135 | 0.11 | 17,446 |
| Example 13 | Compound 13 | 0.27 | 6,601 | 0.15 | 12,294 | 0.13 | 13,667 |
| Comparative Example 1 | Compound 14 | 0.09 | 20,236 | 0.09 | 20,415 | 0.07 | 24,981 |
| Comparative Example 2 | Compound 15 | 0.12 | 15,237 | 0.19 | 9,738 | 0.07 | 26,772 |
| Comparative Example 3 | Compound 16 | 0.05 | 35,088 | 0.05 | 33,478 | 0.31 | 5,803 | except that 16.1 g of 1,4-diisobutoxy-2,3-dicyanonaphthalene was used instead of 16.1 g of 1,4-dibutoxy-2, 3-dicyanonaphthalene in Example 12 of Japanese Published Patent Application A-H08-508269.

[Compound 12] The compound described in Example 1 of Japanese Published Patent Application A-H11-152413

[Compound 13] 0.323 g of octaisobutoxy-nitro metal-free naphthalocyanine (Amax: 873 nm; ε: 186,000 (in toluene)) (I) was obtained in the same manner as in Example 1, except that 0.323 g of copper (I) chloride in Example 1 of Japanese Published Patent Application A-H11-152413 was not added.

Example 9

The calculation procedure for the integral value of the transmittance will be specifically described using Compound 9 (Example 9) as an example. The transmission spectrum (T %) of the compound 9 is measured at a sampling interval of 1 nm in a range of wavelengths from 300 nm to 1,000 nm, and FIG. 8 shows a transmission spectrum in which the transmittance at 780 nm is 10%. In FIG. 8 and FIGS. 9 and 10 described later, the plane with oblique lines indicates "a range that represents the integral value X1", and the dotted plane indicate "a range that represents the integral value X2".

As a result of calculating the integral value (X1) using the transmission spectrum (T %) for each 1 nm in the visible light of 400 nm to 750 nm, it was 13,979.

As a result of calculating the integral value (X2) using the transmission spectrum (T %) for each 1 nm in a 20 nm width (from a wavelength of 770 nm to a wavelength of 790 nm) that was centered on 780 nm, it was 1,957.

It is noted that the ratio R (=X2/X1) of the integral value (X2) to the integral value (X1) was 0.14, and the results of the integral value (X1), the integral value (X2), and the ratio R (=X2/X1) at a wavelength of 780 nm are described in Table 1.

Next, the transmission spectrum (T %) of the compound 9 is measured at a sampling interval of 1 nm in a range of wavelengths from 300 nm to 1,000 nm, and FIG. 9 shows a transmission spectrum in which the transmittance at 830 nm is 10%. The integral value (X1), the integral value (X2), and the ratio R (=X2/X1) at a wavelength of 830 nm were also calculated from FIG. 9 in the same manner as described above. Table 1 shows the results.

Further, the transmission spectrum (T %) of the compound 9 is measured at a sampling interval of 1 nm in a range of wavelengths from 300 nm to 1,000 nm, and FIG. 10 shows a transmission spectrum in which the transmittance at 850 nm is 10%. The integral value (X1), the integral value (X2), and the ratio R (=X2/X1) at a wavelength of 850 nm were also calculated from FIG. 10 in the same manner as described above. Table 1 shows the results.

[Evaluation of the Physical Properties]

The lower limit value of the ratio R (=X2/X1) is 0.09 or more, preferably 0.1 or more, and more preferably 0.11 or more.

In Examples 1 to 13, the value of the ratio R was within the above-described range for three kinds of wavelengths, $\lambda$=780 nm, 830 nm, and 850 nm.

Regarding Comparative Examples 1 to 3, the value of the ratio R was outside the above-described range for any one of the three kinds of wavelengths, $\lambda$=780 nm, 830 nm, and 850 nm.

[Regarding Color Sensation in Visible Range]

The value of the integral value X1 is preferably 17,000 or less.

In Examples 1 to 13, the value of X1 for the three kinds of wavelengths, $\lambda$=780 nm, 830 nm, and 850 nm was included in the above-described range, and thus in a case where the code information CI is printed using the material of each of these Examples, the invisible code shape 20 is formed.

On the other hand, from the viewpoint of security and design, there may be a case where the surface color (the base color) of the printed material 100 is, for example, black. In such a case, a desired object can be realized by using the materials of Comparative Examples 1 to 3.

[Regarding Influence of Particle Diameter]

Regarding the material of Example 7, the results of verifying how the light transmittance and the ratio R (=X2/X1) change depending on the difference in particle diameter are shown.

FIG. 11 is a graph showing the difference in the spectral distribution of light transmittance depending on the particle diameter. FIG. 12 is a graph showing the ratio R (=X2/X1) for each particle diameter.

Experimental conditions (the test sample and the evaluation method) are as follows.

Dye: Resin liquid=1:100 (Resin liquid=5 Wt % DELPET 80N EDC solution)

Test sample: A glass plate (50×50×1 mm) subjected to 2,000 rpm spin coating and 60° C.×1 h drying.

Particle diameter: 0.3 μm, 0.5 μm, 2.0 μm, 0.2 μm (only FIG. 12)

As shown in FIG. 11, in a case where the particle diameter is large, the ability to absorb near infrared rays decreases (transmittance is increased), and a broad spectrum is exhibited.

As shown in FIG. 12, with respect to the ratio R (=X2/X1) as well, the smaller the particle diameter, the larger the ratio R, and good light absorption performance was exhibited in the near infrared ray region (780 nm, 830 nm, and 850 nm).

[Regarding Weather Resistance]

FIG. 13 shows the test results of the accelerated weather resistance (light resistance) of the near infrared ray absorbing material (dye).

The materials of Example 2, Example 7, and Comparative Example 2, which had been exemplified in the absorbance example test described above, were verified.

Experimental conditions (the test sample and the evaluation method) are as follows.

Dye: Resin liquid=1:100 (Resin liquid=5 Wt % DELPET 80N EDC solution)

Test sample: A glass plate (50×50×1 mm) subjected to 2,000 rpm spin coating and 60° C.×1 h drying was set to 0 h, and a test sample was obtained by the following light irradiation method.

Evaluation apparatus: EYE SUPER UV TESTER (SUV-F11) manufactured by IWASAKI ELECTRIC Co., Ltd.

Light irradiation method: A test sample is irradiated with a metal halide lamp (295 to 450 nm (100 mW/cm 2)) in an environment of 60° C.

Evaluation method: The absorbance residual rate (%) was measured every hour after the start of irradiation.

The material of Example 7 was confirmed to have a high absorbance residual rate (%), that is, high weather resistance, even in a case where the light irradiation time was long.

In a case where the code information CI is printed using the material of Example 7, the performance can be maintained for a long period of time.

On the other hand, the materials of Example 2 and Comparative Example 2 require measures such as coating treatment in order to maintain high performance over a long period of time.

In other words, it may not be desirable to maintain high performance over a long period of time from the viewpoint of security. In such a case, a desired purpose can be realized by using the materials of Example 2 and Comparative Example 2.

This application claims priority based on Japanese Patent Application No. 2020-208169 filed on Dec. 16, 2020, and all contents of the disclosure are incorporated herein.

REFERENCE SIGNS LIST 1 base substance
1a, 3a, 6a surface
2 print layer
3 near infrared ray absorbing layer
4 white layer (interposition layer)
5 image layer
6 shielding layer
20 code shape
21 reflection part
22 absorption part (near infrared ray absorbing layer)
61 code mask part

62 outer frame mask part
90 reading device
91 display unit
100 printed material
CI code information
IR near infrared ray
RR reflected light

The invention claimed is:

1. A printed material comprising:

a base substance;

a near infrared ray absorbing layer that is provided on the base substance and contains a near infrared ray absorbing material; and a code shape that is formed in a predetermined shape from the near infrared ray absorbing layer or by covering a part of the near infrared ray absorbing layer and that outputs code information, upon irradiation with a near infrared ray, as reflected light of the near infrared ray, wherein in the near infrared ray absorbing material, in a case where an integral value of transmittance of visible light at 400 nm to 750 nm is denoted as a first integral value X1, and an integral value of transmittance in a 20 nm width that is centered on a predetermined wavelength $\lambda$ of the near infrared ray is denoted as a second integral value X2, a ratio $R=X2/X1$ between the second integral value X2 and the first integral value X1 is 0.09 or more.

2. The printed material according to claim 1, wherein the near infrared ray absorbing layer is provided on the base substance to cover an entire region in which the code shape is provided.

3. The printed material according to claim 1, wherein a value of the first integral value X1 is 17,000 or less.

4. The printed material according to claim 1, wherein the second integral value X2 is calculated in a case where the predetermined wavelength $\lambda$ is at least one of 780 nm, 830 nm, and 850 nm.

5. The printed material according to claim 1, wherein the near infrared ray absorbing material is a naphthalocyanine-based compound.

6. The printed material according to claim 5, wherein the naphthalocyanine-based compound is a vanadyl naphthalocyanine compound which may have a substituent.

7. The printed material according to claim 1, wherein the near infrared ray absorbing material is a pigment and has a particle diameter $D_{50}$ of 0.05 $\mu$m or more and 1.0 $\mu$m or less.

8. The printed material according to claim 1, further comprising:

an interposition layer having a reflectivity of light of near infrared rays of 70% or more, between the base substance and the near infrared ray absorbing layer.

9. The printed material according to claim 1, further comprising:

an image layer that covers the code shape, which has a transmittance of near infrared rays of 80% or more.

* * * * *